United States Patent
Zhou et al.

(10) Patent No.: US 12,058,652 B2
(45) Date of Patent: Aug. 6, 2024

(54) BANDWIDTH PART FOR MULTICAST AND BROADCAST SERVICES

(71) Applicant: Ofinno, LLC, Reston, VA (US)

(72) Inventors: Hua Zhou, Vienna, VA (US); Esmael Hejazi Dinan, McLean, VA (US); Yunjung Yi, Vienna, VA (US); Ali Cagatay Cirik, Chantilly, VA (US); Hyoungsuk Jeon, Centreville, VA (US); Hyukjin Chae, Fairfax, VA (US); Jonghyun Park, Syosset, NY (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/975,159

(22) Filed: Oct. 27, 2022

(65) Prior Publication Data

US 2023/0049868 A1 Feb. 16, 2023

Related U.S. Application Data

(63) Continuation of application No. PCT/US2021/055431, filed on Oct. 18, 2021.

(Continued)

(51) Int. Cl.
*H04W 72/04* (2023.01)
*H04W 72/044* (2023.01)
(Continued)

(52) U.S. Cl.
CPC ......... *H04W 72/044* (2013.01); *H04W 72/23* (2023.01)

(58) Field of Classification Search
CPC ...... H04W 72/044; H04W 72/23; H04W 4/06
See application file for complete search history.

(56) References Cited

U.S. PATENT DOCUMENTS

2019/0132110 A1* 5/2019 Zhou ............... H04W 76/38
2019/0132824 A1* 5/2019 Jeon ............... H04L 5/00
(Continued)

FOREIGN PATENT DOCUMENTS

EP 2 141 852 A1 1/2010
WO 2013/067298 A1 5/2013
(Continued)

OTHER PUBLICATIONS

TechPlayOn, "5G NR Transport Block Size (TBS) Calculation," Aug. 16, 2020, https://www.techplayon.com/5g-nr-transport-block-size-tbs-calculation/#:~:text=Transport%20Block%20in%205G%20NR,transmission%20over%20the%20air%20interface (Year: 2020).*

(Continued)

*Primary Examiner* — Maharishi V Khirodhar
*Assistant Examiner* — Kenneth P Hunt
(74) *Attorney, Agent, or Firm* — Peter Flanagan; Kavon Nasabzadeh; Philip R. Smith

(57) ABSTRACT

A wireless device may receive radio resource control messages indicating, among other things, a bandwidth part (BWP) of a cell, having at least first resource blocks (RBs) and second RBs; common frequency resources, including at least the first RBs of the BWP, associated with a multicast and broadcast service (MBS) configured for wireless devices comprising the wireless device; and a radio network temporary identifier (RNTI) associated with the MBS. The wireless device may also receive a group common downlink control information (DCI) addressed to the RNTI via the common frequency resources of the BWP. In an embodiment, the group common DCI may indicate a multicast transmission of a transport block to the wireless device. The wireless device may also start a BWP inactivity timer of the cell in response to receiving the group common DCI.

20 Claims, 32 Drawing Sheets

Related U.S. Application Data

(60) Provisional application No. 63/092,586, filed on Oct. 16, 2020.

(51) Int. Cl.
*H04W 72/12* (2023.01)
*H04W 72/23* (2023.01)

(56) References Cited

U.S. PATENT DOCUMENTS

| | | | | |
|---|---|---|---|---|
| 2019/0132855 A1* | 5/2019 | Lee | ................ | H04W 72/1273 |
| 2019/0200392 A1* | 6/2019 | Agiwal | ................ | H04L 5/0098 |
| 2019/0208548 A1* | 7/2019 | Shih | ................ | H04W 72/23 |
| 2019/0254110 A1* | 8/2019 | He | ................ | H04W 76/28 |
| 2019/0281504 A1* | 9/2019 | Su | ................ | H04W 52/28 |
| 2019/0281598 A1* | 9/2019 | Almalfouh | ................ | H04W 28/18 |
| 2021/0250918 A1* | 8/2021 | Liu | ................ | H04L 5/0053 |
| 2022/0322400 A1* | 10/2022 | Hu | ................ | H04W 72/0446 |

FOREIGN PATENT DOCUMENTS

| | | |
|---|---|---|
| WO | 2016/121665 A1 | 8/2016 |
| WO | 2020/164605 A1 | 8/2020 |
| WO | 2021/139747 A1 | 7/2021 |

OTHER PUBLICATIONS

3GPP, "ETSI TS 138 202 V15.3.0 Services provided by the physical layer," Oct. 2018, p. 7, https://www.etsi.org/deliver/etsi_ts/138200_138299/138202/15.03.00_60/ts_138202v150300p.pdf (Year: 2018).*
Lin et. al., "A Primer on Bandwidth Parts in 5G New Radio," Sep. 22, 2018, Ericsson, pp. 6-7 https://arxiv.org/ftp/arxiv/papers/2004/2004.00761.pdf (Year: 2018).*
3GPP TS 36.212 V16.1.0 (Mar. 2020); Technical Specification; 3rd Generation Partnership Project; Technical Specification Group Radio Access Network; Evolved Universal Terrestrial Radio Access (E-UTRA); Multiplexing and channel coding; (Release 16).
3GPP TS 36.321 V16.0.0 (Mar. 2020); Technical Specification; 3rd Generation Partnership Project; Technical Specification Group Radio Access Network; Evolved Universal Terrestrial Radio Access (E-UTRA); Medium Access Control (MAC) protocol specification; (Release 16).
3GPP TS 36.331 V16.0.0 (Mar. 2020); Technical Specification; 3rd Generation Partnership Project; Technical Specification Group Radio Access Network; Evolved Universal Terrestrial Radio Access (E-UTRA); Radio Resource Control (RRC); Protocol specification; (Release 16).
3GPP TS 38.211 V16.2.0 (Jun. 2020); Technical Specification; 3rd Generation Partnership Project; Technical Specification Group Radio Access Network; NR; Physical channels and modulation; (Release 16).
3GPP TS 38.212 V16.2.0 (Jun. 2020); Technical Specification; 3rd Generation Partnership Project; Technical Specification Group Radio Access Network; NR; Multiplexing and channel coding; (Release 16).
3GPP TS 38.213 V16.2.0 (Jun. 2020); Technical Specification; 3rd Generation Partnership Project; Technical Specification Group Radio Access Network; NR; Physical layer procedures for control; (Release 16).
3GPP TS 38.214 V16.2.0 (Jun. 2020); Technical Specification; 3rd Generation Partnership Project; Technical Specification Group Radio Access Network; NR; Physical layer procedures for data; (Release 16).
3GPP TS 38.321 V16.1.0 (Jun. 2020); Technical Specification; 3rd Generation Partnership Project; Technical Specification Group Radio Access Network; NR; Medium Access Control (MAC) protocol specification; (Release 16).
3GPP TS 38.331 V16.1.0 (Jul. 2020); Technical Specification; 3rd Generation Partnership Project; Technical Specification Group Radio Access Network; NR; Radio Resource Control (RRC) protocol specification; (Release 16).
R1-2005249; 3GPP TSG RAN WG1 Meeting #102-e; E-meeting, Aug. 17-28, 2020; Agenda Item: 8.12.1; Source: Huawei, HiSilicon; Title: Resource configuration and group scheduling for RRC_CONNECTED UEs; Document for: Discussion and Decision.
R1-2005250; 3GPP TSG RAN WG1 Meeting #102-e; E-meeting, Aug. 17-28, 2020; Agenda Item: 8.12.2; Source: Huawei, HiSilicon; Title: Mechanisms to improve reliability for RRC_CONNECTED UEs; Document for: Discussion and Decision.
R1-2005406; 3GPP TSG RAN WG1 #102-e; e-Meeting, Aug. 17-28, 2020; Source: vivo; Title: Discussion on mechanisms to support group scheduling for RRC_CONNECTED UEs; Agenda Item: 8.12.1; Document for: Discussion and Decision.
R1-2005407; 3GPP TSG RAN WG1 #102-e; e-Meeting, Aug. 17-28, 2020; Source: vivo; Title: Discussion on mechanisms to improve reliability for RRC_CONNECTED UEs; Agenda Item: 8.12.2; Document for: Discussion and Decision.
R1-2005436; 3GPP TSG RAN WG1 Meeting #102-e; e-Meeting, Aug. 17-28, 2020; Source: ZTE; Title: Mechanisms to Support Group Scheduling for RRC_CONNECTED UEs; Agenda item: 8.12.1; Document for: Discussion/Decision.
R1-2005437; 3GPP TSG RAN WG1 Meeting #102-e; e-Meeting, Aug. 17-28, 2020; Source: ZTE; Title: Mechanisms to Improve Reliability for RRC_CONNECTED UEs; Agenda item: 8.12.2; Document for: Discussion/Decision.
R1-2005531; 3GPP TSG RAN WG1 Meeting #102-e; e-Meeting, Aug. 17-Aug. 28, 2020; Agenda item: 8.12.1; Source: Nokia, Nokia Shanghai Bell; Title: Group Scheduling Mechanisms to Support 5G Multicast / Broadcast Services for RRC_CONNECTED UEs; Document for: Discussion and Decision.
R1-2005532; 3GPP TSG RAN WG1 Meeting #102-e; e-Meeting, Aug. 17-Aug. 28, 2020; Agenda item: 8.12.2; Source: Nokia, Nokia Shanghai Bell; Title: Mechanisms for 5G Multicast / Broadcast Reliability Improvements for RRC_CONNECTED UEs; Document for: Discussion and Decision.
R1-2005589; 3GPP TSG RAN WG1 Meeting #102-e; e-Meeting, Aug. 17-28, 2020; Agenda Item: 8.12.1; Source: Sony; Title: Considerations on MBMS group scheduling for RRC_CONNECTED UEs; Document for: Discussion and Decision.
R1-2005590; 3GPP TSG RAN WG1 Meeting #102-e; e-Meeting, Aug. 17-28, 2020; Agenda Item: 8.12.2; Source: Sony; Title: Considerations on MBMS reliability for RRC_CONNECTED UEs; Document for: Discussion and Decision.
R1-2005693; 3GPP TSG RAN WG1 Meeting #102-e; e-Meeting, Aug. 17-28, 2020; Source: CATT; Title: Discussion on group scheduling mechanism for RRC_CONNECTED UEs in MBS; Agenda Item: 8.12.1; Document for: Discussion and Decision.
R1-2005694; 3GPP TSG RAN WG1 #102e; e-Meeting, Aug. 17-28, 2020; Source: CATT; Title: Discussion on reliability improvement mechanism for RRC_CONNECTED UEs in MBS; Agenda Item: 8.12.2; Document for: Discussion and Decision.
R1-2005898; 3GPP TSG RAN WG1 #102-e; e-Meeting, Aug. 18-28, 2020; Source: Intel Corporation; Title: Group Scheduling for NR MBS; Agenda item: 8.12.1; Document for: Discussion and Decision.
R1-2005899; 3GPP TSG RAN WG1 #102-e; e-Meeting, Aug. 18-28, 2020; Source: Intel Corporation; Title: Mechanisms to Improve Reliability of NR MBS; Agenda item: 8.12.2; Document for: Discussion and Decision.
R1-2006013; 3GPP TSG RAN WG1 #102-e; e-Meeting, Aug. 17-28, 2020; Source: OPPO; Title: Group scheduling for NR Multicast and Broadcast Services; Agenda Item: 8.12.1; Document for: Discussion and Decision.
R1-2006014; 3GPP TSG RAN WG1 #102-e; e-Meeting, Aug. 17-28, 2020; Source: OPPO; Title: UL feedback for RRC-CONNECTED UEs in MBMS; Agenda Item: 8.12.2; Document for: Discussion and Decision.
R1-2006173; 3GPP TSG RAN WG1 #102-e Meeting; e-Meeting, Aug. 17-28, 2020; Agenda item: 8.12.1; Source: Samsung; Title: On Mechanisms to support group scheduling for RRC_CONNECTED UEs; Document for: Discussion and Decision.

(56) References Cited

OTHER PUBLICATIONS

R1-2006174; 3GPP TSG RAN WG1 #102-e Meeting; e-Meeting, Aug. 17-28, 2020; Agenda item: 8.12.2; Source: Samsung; Title: On Mechanisms to improve reliability for RRC_CONNECTED UEs; Document for: Discussion and Decision.
R1-2006233; 3GPP TSG RAN WG1 #102-e; e-Meeting, Aug. 17-28, 2020; Source: CMCC; Title: Discussion on group scheduling mechanisms in NR MBS; Agenda item: 8.12.1; Document for: Discussion & Decision.
R1-2006234; 3GPP TSG RAN WG1 #102-e; e-Meeting, Aug. 17-28, 2020; Source: CMCC; Title: Discussion on reliability improvement in NR MBS; Agenda item: 8.12.2; Document for: Discussion & Decision.
R1-2006320; 3GPP TSG RAN WG1 Meeting #102-e; Online, Aug. 17-28, 2020; Agenda Item: 8.12.1; Source: LG Electronics Inc.; Title: Support of group scheduling for RRC_CONNECTED UEs; Document for: Discussion and decision.
R1-2006321; 3GPP TSG RAN WG1 Meeting #102-e; Online, Aug. 17-28, 2020; Agenda Item: 8.12.2; Source: LG Electronics Inc.; Title: Mechanisms to improve Reliability of Broadcast/Multicast service; Document for: Discussion and decision.
R1-2006631; 3GPP TSG RAN WG1 #102-e; e-Meeting, Aug. 17-28, 2020; Agenda item: 8.12.1 Mechanisms to support group scheduling for RRC_CONNECTED UEs; Title:On group scheduling mechanism for NR multicast and broadcast; Source: Convida Wireless; Document for: Discussion.
R1-2006632; 3GPP TSG RAN WG1 #102-e; e-Meeting, Aug. 17-28, 2020; Agenda item: 8.12.2 Mechanisms to improve reliability for RRC_CONNECTED UEs; Title: On reliability enhancement for NR multicast and broadcast; Source: Convida Wireless; Document for: Discussion.
R1-2006830; 3GPP TSG RAN WG1 #102-e; e-Meeting, Aug. 17-28, 2020; Agenda item: 8.12.1; Source: Qualcomm Incorporated; Title: View on group scheduling for Multicast RRC_CONNECTED UEs; Document for: Discussion and Decision.
R1-2006831; 3GPP TSG RAN WG1 #102-e; e-Meeting, Aug. 17-28, 2020; Agenda item: 8.12.2; Source: Qualcomm Incorporated; Title: View on UE feedback for Multicast RRC_CONNECTED UEs; Document for: Discussion and Decision.
R1-2006863; 3GPP TSG RAN WG1 #102-e; e-Meeting, Aug. 17-28, 2020; Agenda item: 8.12.2; Source: BBC; Title: HARQ-based time-interleaving for NR Multicast/Broadcast; Document for: Discussion.
R1-2006918; 3GPP TSG-RAN WG1 Meeting #102-e; eMeeting, Aug. 17-28, 2020; Agenda Item: 8.12.1; Source: Ericsson; Title: Mechanisms for group scheduling of RRC_CONNECTED UEs in NR; Document for: Discussion.
R1-2006919; 3GPP TSG-RAN WG1 Meeting #102-e; eMeeting, Aug. 17-28, 2020; Agenda Item: 8.12.2; Source: Ericsson; Title: Mechanisms to improve reliability for RRC_Connected UEs receiving PTM transmission; Document for: Discussion and Decision.
R2-2006597; 3GPP TSG RAN WG2#111-e; Electronic meeting, Aug. 17-Aug. 28; Source: CATT; Title: Consideration on Idle and Inactive mode UEs; Agenda Item: 8.1.3; Document for: Discussion and Decision.
R2-2006804; 3GPP TSG-RAN WG2 Meeting #111 electronic; Online, Aug. 17-28, 2020; Agenda Item: 8.1.1; Source: OPPO; Title: General considerations for MBS in RRC_CONNECTED; Document for: Discussion and decision.
R2-2007178; 3GPP TSG RAN WG2 Meeting# 111 electronic; Electronic Aug. 17-28, 2020; Agenda Item: 8.1.2; Source: Sony; Title: NR multicast in connected mode; Document for: Discussion.
R2-2007442; 3GPP TSG-RAN WG2 Meeting #111 electronic; Online, Aug. 17-28, 2020; Title: Scope and Architecture analysis of NR MBS; Source: ZTE, Sanechips; Agenda Item: 8.1.1; Document for: Discussion, Decision.
R2-2007466; 3GPP TSG-RAN WG2 Meeting #111e; Online, Aug. 17-28, 2020; Agenda item: 8.1.2.1; Source: Lenovo, Motorola Mobility; Title: Protocols and Dynamic Switching for 5G MBS PTP and PTM; Document for: Discussion and Decision.
R2-2007672; 3GPP TSG RAN WG2 Meeting #111-e; e-Meeting, August 17-Aug. 28, 2020; Agenda item: 8.1.1; Source: Samsung; Title: On Stage-2 aspects and overview of NR MBS; WID/SID: NR_MBS—Release 17; Document for: Discussion and Decision.
R2-2007993; 3GPP TSG-RAN WG2 Meeting #111 electronic; Online, Aug. 17-28, 2020; Agenda item: 8.1.1; Source: LG Electronics Inc.; Title: Consideration on BWP and beam in NR multicast; Document for: Discussion and Decision.
3GPP TS 36.211 V16.1.0 (Mar. 2020); Technical Specification; 3rd Generation Partnership Project; Technical Specification Group Radio Access Network; Evolved Universal Terrestrial Radio Access (E-UTRA); Physical channels and modulation; (Release 16).
3GPP TS 36.213 V16.1.0 (Mar. 2020); Technical Specification; 3rd Generation Partnership Project; Technical Specification Group Radio Access Network; Evolved Universal Terrestrial Radio Access (E-UTRA); Physical layer procedures; (Release 16).
International Search Report of the International Searching Authority, mailed Feb. 18, 2022, in International Application No. PCT/US2021/055431.

* cited by examiner

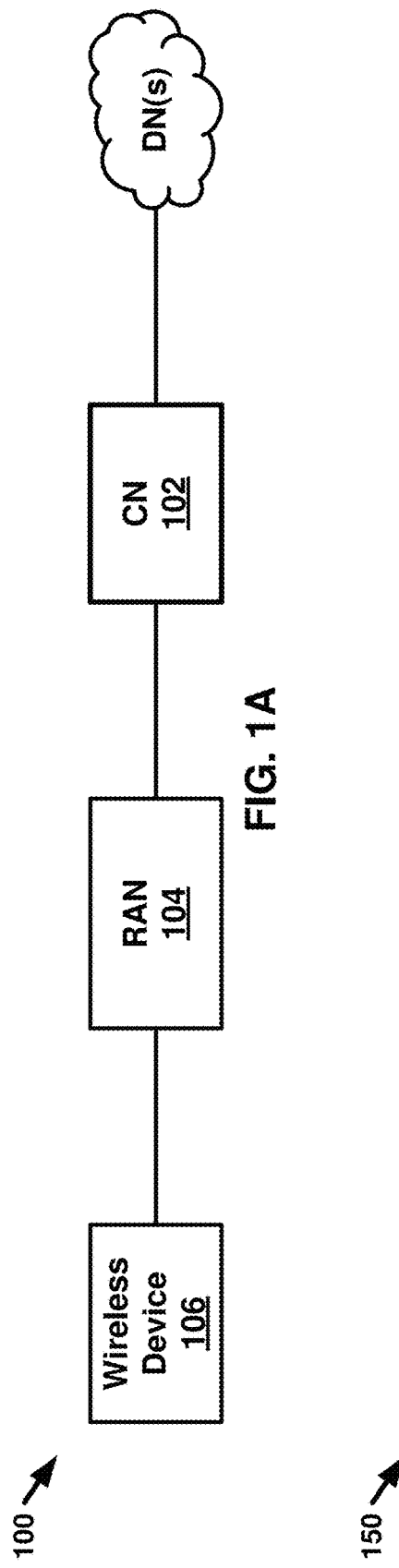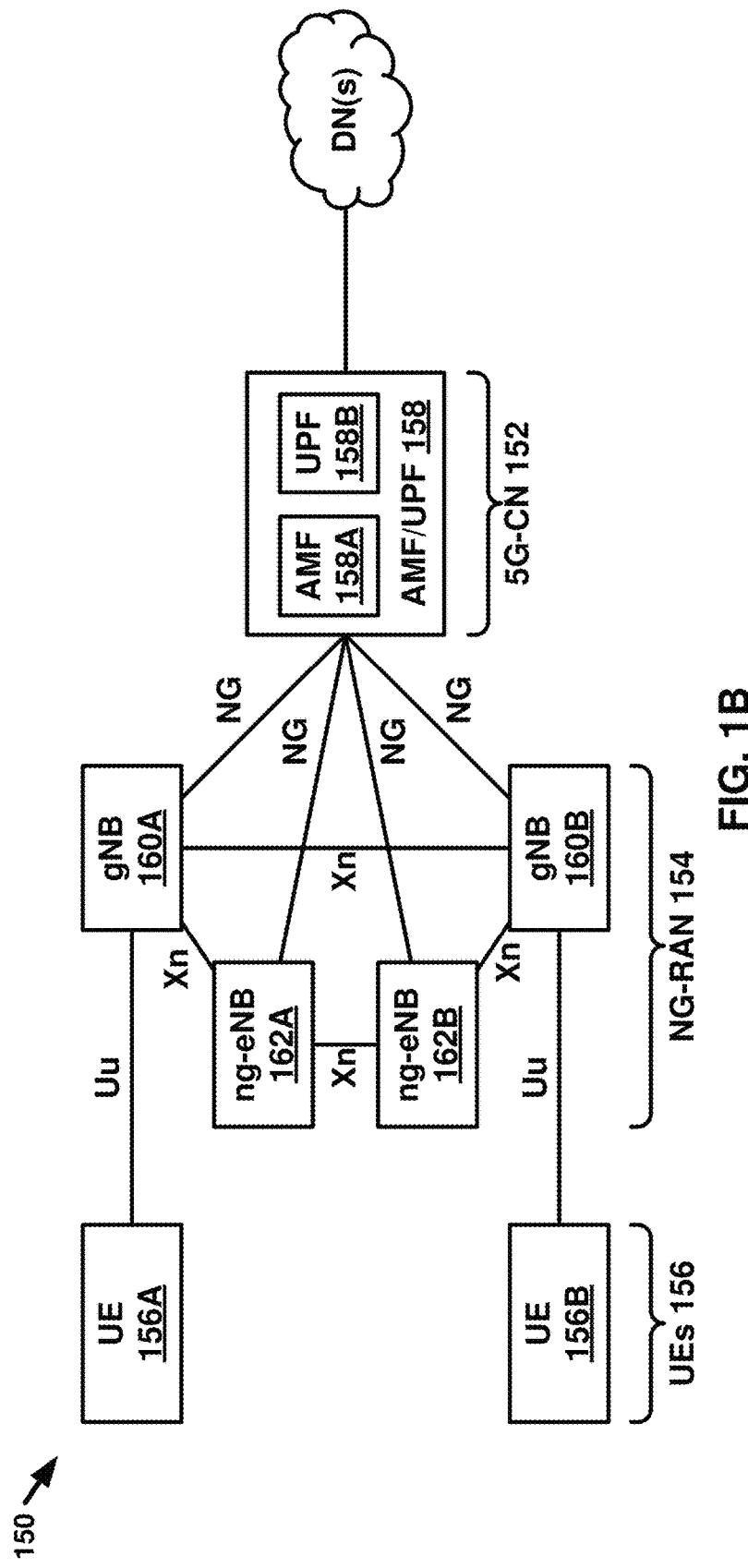
FIG. 1A
FIG. 1B

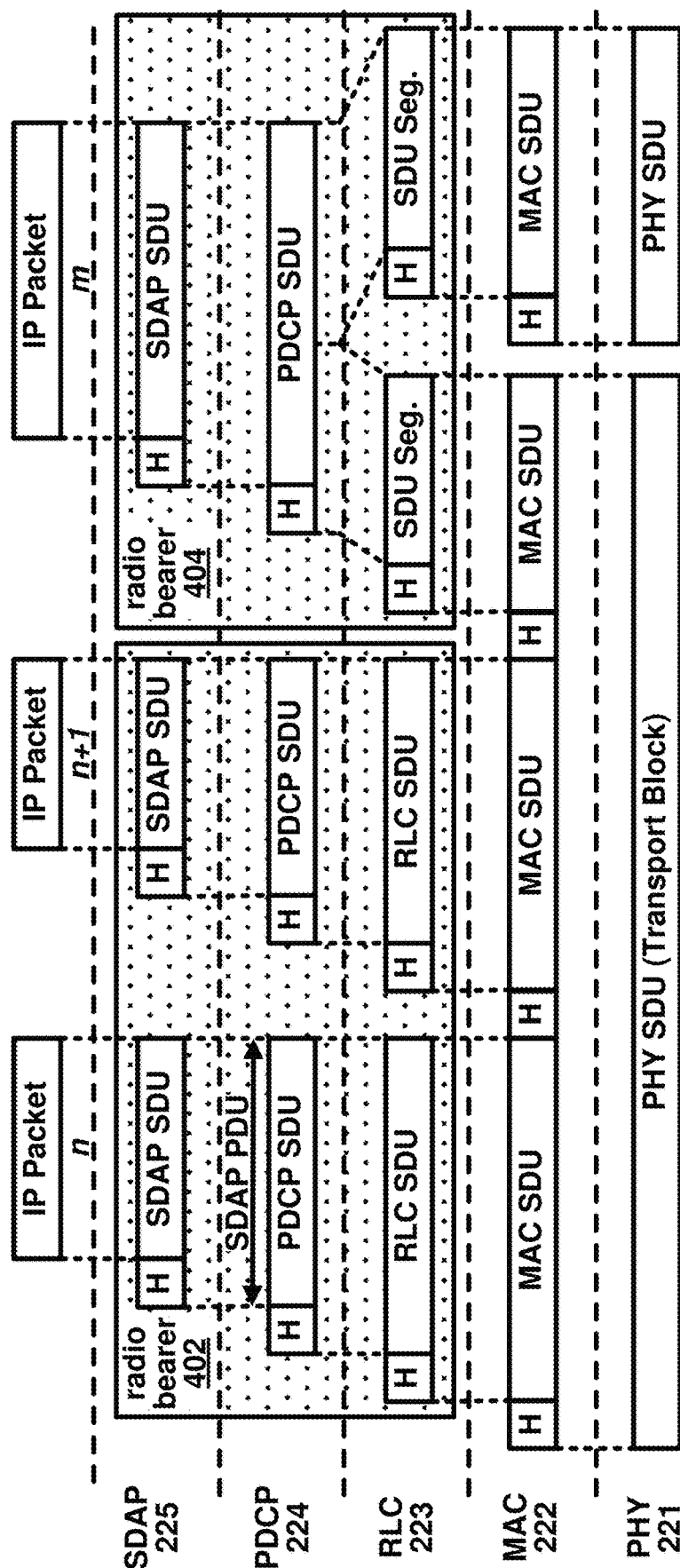
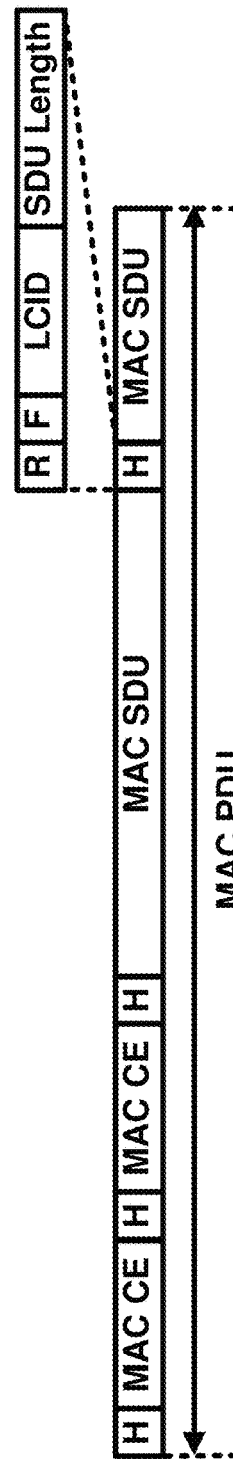
FIG. 4A
FIG. 4B

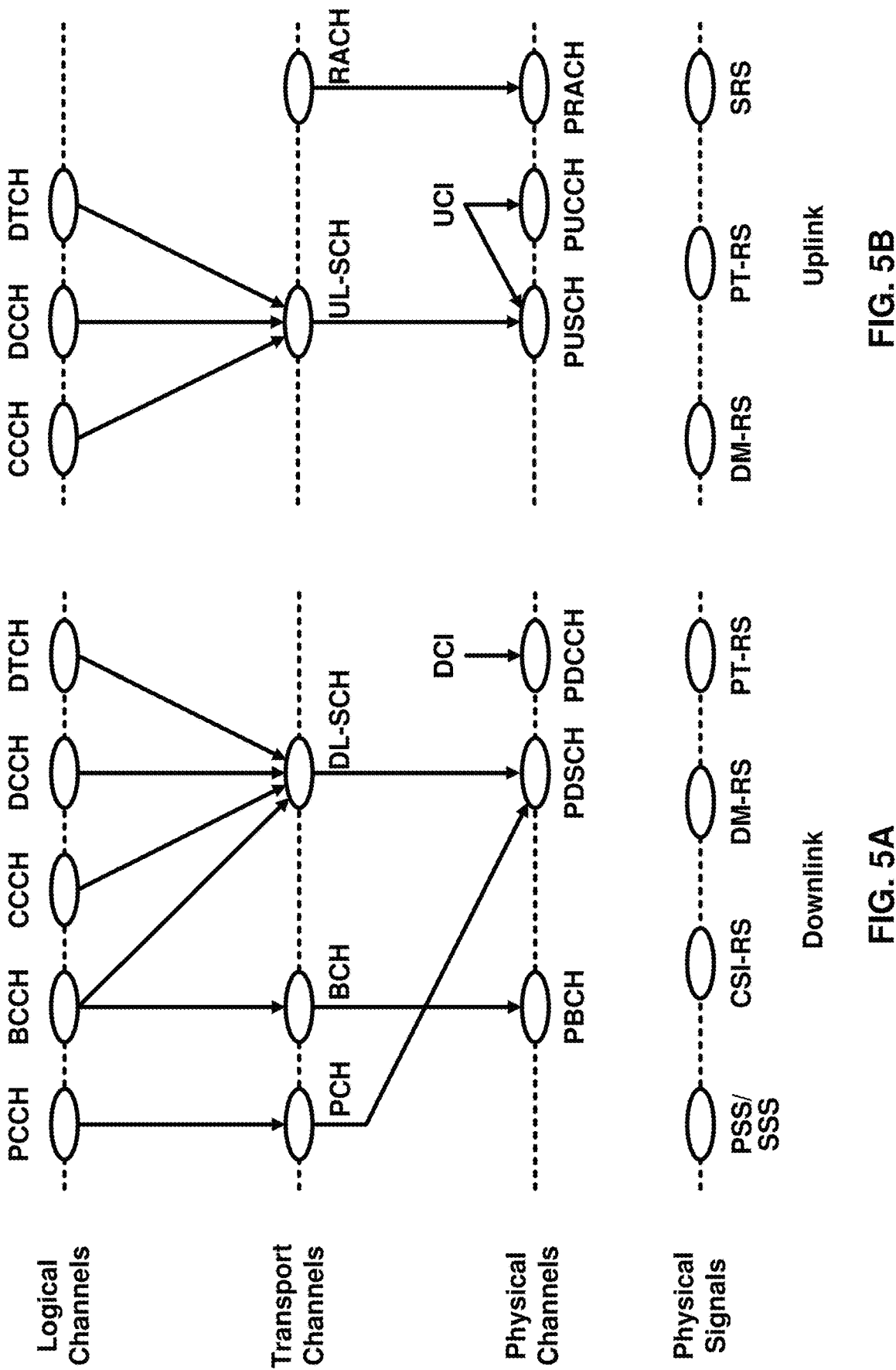

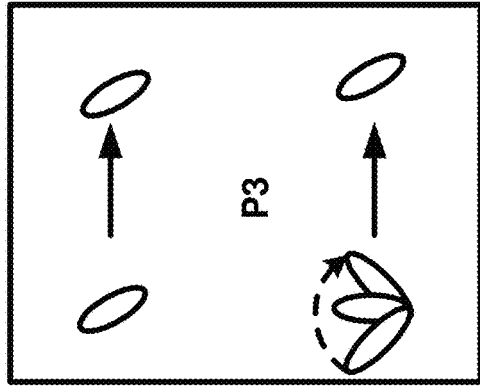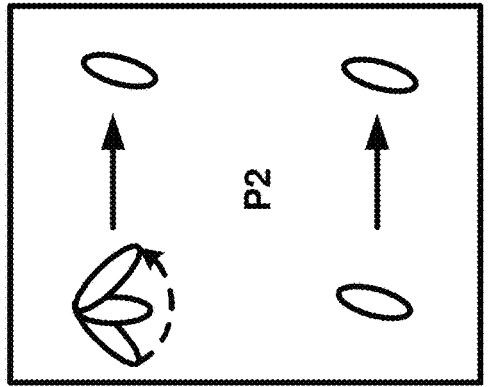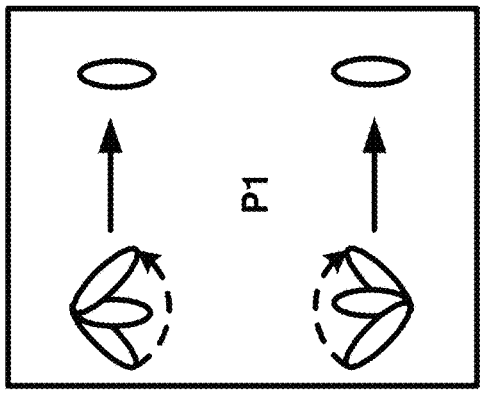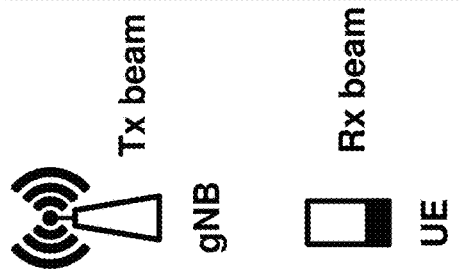
FIG. 12A
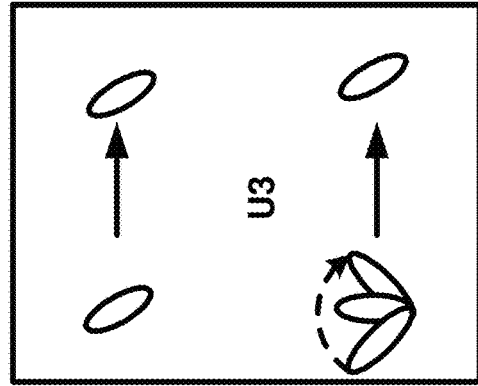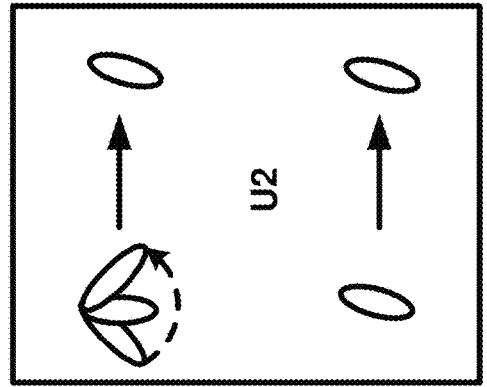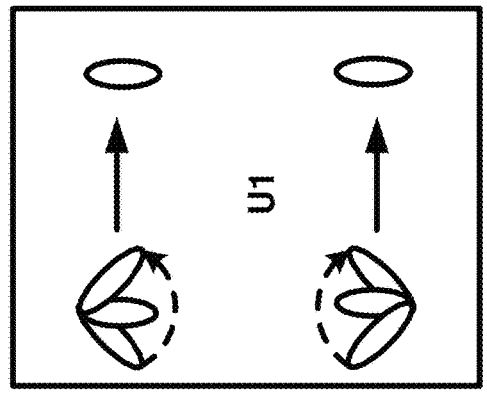
FIG. 12B

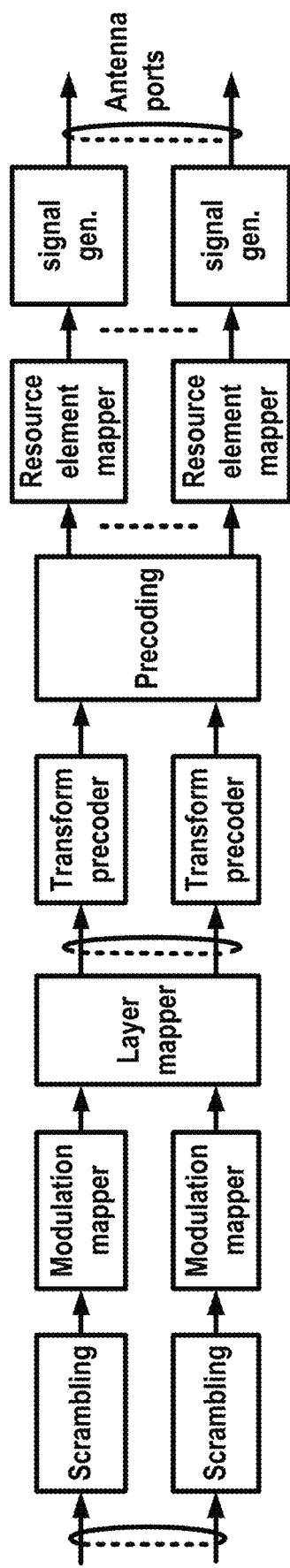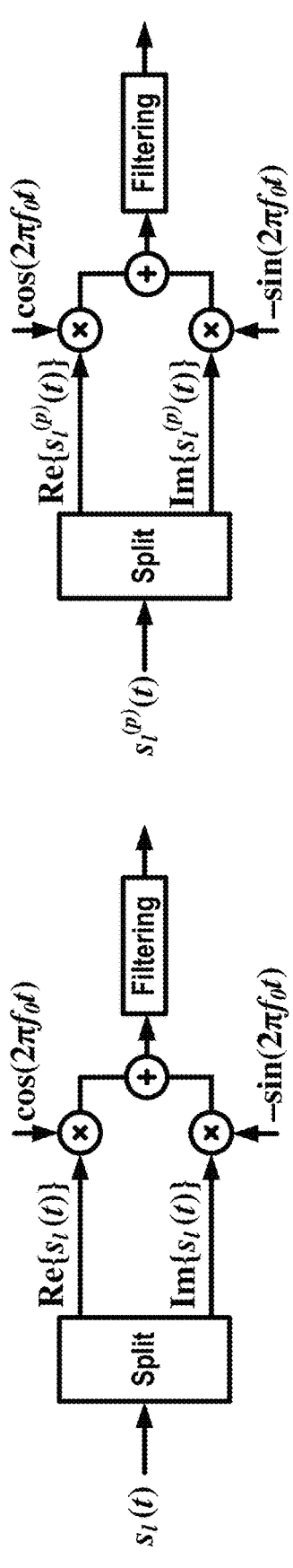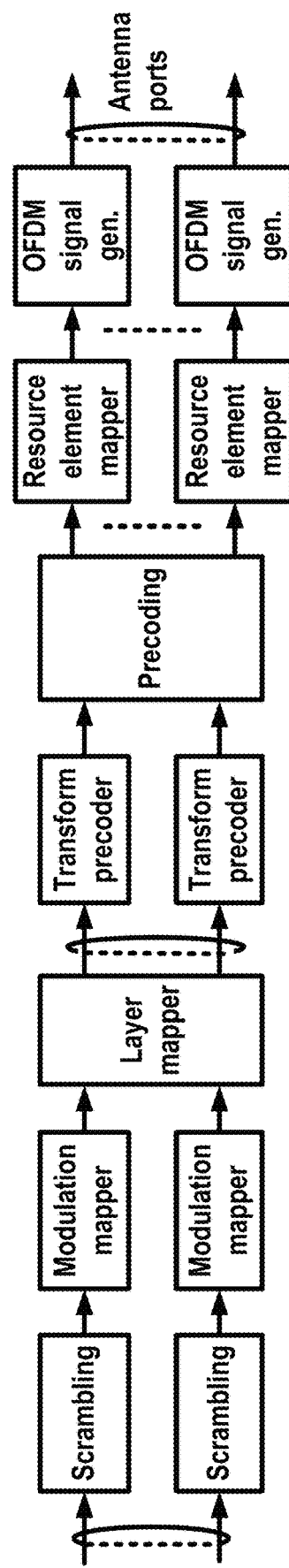
FIG. 16A
FIG. 16B
FIG. 16C
FIG. 16D

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

| $C_7$ | $C_6$ | $C_5$ | $C_4$ | $C_3$ | $C_2$ | $C_1$ | R | Oct 1 |

FIG. 21A

| $C_7$ | $C_6$ | $C_5$ | $C_4$ | $C_3$ | $C_2$ | $C_1$ | R | Oct 1 |
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

FIG. 21B

```
MIB ::=                         SEQUENCE {
    systemFrameNumber               BIT STRING (SIZE (6)),
    subCarrierSpacingCommon         ENUMERATED {scs15or60, scs30or120},
    ssb-SubcarrierOffset            INTEGER (0..15),
    dmrs-TypeA-Position             ENUMERATED {pos2, pos3},
    pdcch-ConfigSIB1                PDCCH-ConfigSIB1,
    cellBarred                      ENUMERATED {barred, notBarred},
    intraFreqReselection            ENUMERATED {allowed, notAllowed},
    spare                           BIT STRING (SIZE (1))}

PDCCH-ConfigSIB1 ::=            SEQUENCE {
    controlResourceSetZero          ControlResourceSetZero,
    searchSpaceZero                 SearchSpaceZero}
```

FIG. 23A

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

FIG. 23B

| Index | $O$ | Number of search space sets per slot | $M$ | First symbol index |
|---|---|---|---|---|
| 0 | 0 | 1 | 1 | 0 |
| 1 | 0 | 2 | 1/2 | {0, if $i$ is even}, {$N_{symb}^{CORESET}$, if $i$ is odd} |
| 2 | 2 | 1 | 1 | 0 |
| 3 | 2 | 2 | 1/2 | {0, if $i$ is even}, {$N_{symb}^{CORESET}$, if $i$ is odd} |
| 4 | 5 | 1 | 1 | 0 |
| 5 | 5 | 2 | 1/2 | {0, if $i$ is even}, {$N_{symb}^{CORESET}$, if $i$ is odd} |
| 6 | 7 | 1 | 1 | 0 |
| 7 | 7 | 2 | 1/2 | {0, if $i$ is even}, {$N_{symb}^{CORESET}$, if $i$ is odd} |
| ... | ... | ... | ... | ... |

FIG. 23C

```
SIB1 ::=        SEQUENCE {
    cellSelectionInfo           SEQUENCE {
        q-RxLevMin                  Q-RxLevMin,
        q-RxLevMinOffset            INTEGER (1..8) ...}
    cellAccessRelatedInfo       CellAccessRelatedInfo,
    connEstFailureControl       ConnEstFailureControl
    si-SchedulingInfo           SI-SchedulingInfo
    servingCellConfigCommon     ServingCellConfigCommonSIB
    ims-EmergencySupport        ENUMERATED {true}
    eCallOverIMS-Support        ENUMERATED {true}
    ue-TimersAndConstants       UE-TimersAndConstants
    uac-BarringInfo             SEQUENCE { ...}
    useFullResumeID             ENUMERATED {true}
    lateNonCriticalExtension    OCTET STRING
    nonCriticalExtension        SIB1-v16xy-IEs }
SIB1-v16xy-IEs ::=      SEQUENCE {
    idleModeMeasurements-r16    ENUMERATED{ffs}
    posSI-SchedulingInfoList-r16    PosSI-SchedulingInfoList-r16
    nonCriticalExtension        SEQUENCE {} }

ServingCellConfigCommonSIB ::=      SEQUENCE {
    downlinkConfigCommon        DownlinkConfigCommonSIB,
    uplinkConfigCommon          UplinkConfigCommonSIB
    supplementaryUplink         UplinkConfigCommonSIB
    n-TimingAdvanceOffset       ENUMERATED { n0, n25600, n39936 }
    ssb-PositionsInBurst        SEQUENCE {
        inOneGroup              BIT STRING (SIZE (8)),
        groupPresence           BIT STRING (SIZE (8)) },
    ssb-PeriodicityServingCell  ENUMERATED {ms5, ms10, ms20, ms40, ms80, ms160},
    tdd-UL-DL-ConfigurationCommon   TDD-UL-DL-ConfigCommon
    ss-PBCH-BlockPower          INTEGER (-60..50),
    ...}

DownlinkConfigCommonSIB ::=     SEQUENCE {
    frequencyInfoDL             FrequencyInfoDL-SIB,
    initialDownlinkBWP          BWP-DownlinkCommon,
    bcch-Config                 BCCH-Config,
    pcch-Config                 PCCH-Config, ...}

UplinkConfigCommonSIB ::=       SEQUENCE {
    frequencyInfoUL             FrequencyInfoUL-SIB,
    initialUplinkBWP            BWP-UplinkCommon,
    timeAlignmentTimerCommon    TimeAlignmentTimer}
```

FIG. 24

```
BWP-DownlinkCommon ::=      SEQUENCE {
    genericParameters       BWP,
    pdcch-ConfigCommon      SetupRelease { PDCCH-ConfigCommon }
    pdsch-ConfigCommon      SetupRelease { PDSCH-ConfigCommon }
    ...
}

PDCCH-ConfigCommon ::=      SEQUENCE {
    controlResourceSetZero          ControlResourceSetZero
    commonControlResourceSet        ControlResourceSet
    searchSpaceZero                 SearchSpaceZero
    commonSearchSpaceList           SEQUENCE (SIZE(1..4)) OF SearchSpace
    searchSpaceSIB1                 SearchSpaceId
    searchSpaceOtherSystemInformation   SearchSpaceId
    pagingSearchSpace               SearchSpaceId
    ra-SearchSpace                  SearchSpaceId
    ...,}

ControlResourceSet ::=      SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                 SEQUENCE {
            reg-BundleSize              ENUMERATED {n2, n3, n6},
            interleaverSize             ENUMERATED {n2, n3, n6},
            shiftIndex                  INTEGER(0..maxNrofPhysicalResourceBlocks-1)},
        nonInterleaved              NULL},
    precoderGranularity             ENUMERATED {sameAsREG-bundle, allContiguousRBs},
    pdcch-DMRS-ScramblingID         INTEGER (0..65535)
    ...,
[[
    rb-Offset-r16                   INTEGER (0..5)
    tci-PresentInDCI-ForDCI-Format1-2-r16   INTEGER (1..3)
    coresetPoolIndex-r16            INTEGER (0..1)
    controlResourceSetId-r16        ControlResourceSetId-r16]]
}
```

FIG. 25

```
SearchSpace ::=                          SEQUENCE {
    searchSpaceId                        SearchSpaceId,
    controlResourceSetId                 ControlResourceSetId
    monitoringSlotPeriodicityAndOffset   CHOICE {
        sl1                              NULL,
        sl2                              INTEGER (0..1),
        sl4                              INTEGER (0..3),
        sl5                              INTEGER (0..4),
        sl8                              INTEGER (0..7),  ...}
    duration                             INTEGER (2..2559)
    monitoringSymbolsWithinSlot          BIT STRING (SIZE (14))
    nrofCandidates                       SEQUENCE {
        aggregationLevel1                ENUMERATED {n0, n1, n2, n3, n4, n5, n6, n8},
        aggregationLevel2                ENUMERATED {n0, n1, n2, n3, n4, n5, n6, n8}, ...}
    searchSpaceType                      CHOICE {
        common                           SEQUENCE {
            dci-Format0-0-AndFormat1-0       SEQUENCE { ...}
            dci-Format2-0                SEQUENCE {
                nrofCandidates-SFI           SEQUENCE {
                    aggregationLevel1            ENUMERATED {n1, n2}
                    aggregationLevel2            ENUMERATED {n1, n2} ...},
                ...}
            dci-Format2-1                SEQUENCE { ... }
            dci-Format2-2                SEQUENCE { ... }
            dci-Format2-3                SEQUENCE {
                dummy1                       ENUMERATED {sl1, sl2, sl4, sl5, ...}
                dummy2                       ENUMERATED {n1, n2}, ...}
        },
        ue-Specific                      SEQUENCE {
            dci-Formats                  ENUMERATED {formats0-0-And-1-0, formats0-1-And-1-1},
            ...,}
    }
}
```

FIG. 26

BANDWIDTH PART FOR MULTICAST AND BROADCAST SERVICES

CROSS-REFERENCE TO RELATED APPLICATIONS

This application is a continuation of International Application No. PCT/US2021/055431, filed Oct. 18, 2021 which claims the benefit of U.S. Provisional Application No. 63/092,586, filed Oct. 16, 2020, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example mobile communication networks in which embodiments of the present disclosure may be implemented.

FIG. 4A illustrates an example downlink data flow through the NR user plane protocol stack of FIG. 2A.

FIG. 4B illustrates an example format of a MAC subheader in a MAC PDU.

FIG. 5A and FIG. 5B respectively illustrate a mapping between logical channels, transport channels, and physical channels for the downlink and uplink.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 19 illustrates a table showing example LCIDs for downlink, according to some embodiments.

FIG. 20 illustrates a table showing example LCIDs for uplink, according to some embodiments.

FIG. 21A and FIG. 21B illustrate examples of SCell activation/deactivation MAC CE formats, according to some embodiments.

FIG. 23A, FIG. 23B and FIG. 23C illustrate examples of configuration parameters of a MIB, according to some embodiments.

FIG. 24 illustrates an example of RRC configuration of a SIB1 message, according to some embodiments.

FIG. 25 illustrates an example of RRC configuration of a downlink BWP, according to some embodiments.

FIG. 26 illustrates an example of RRC configuration of a search space, according to some embodiments.

DETAILED DESCRIPTION

Figure 2A:
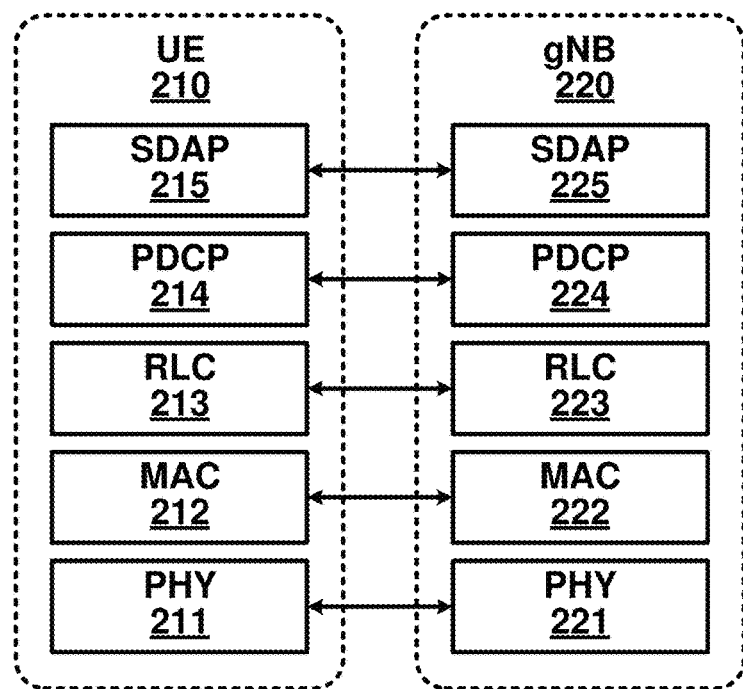
FIG. 2A and FIG. 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
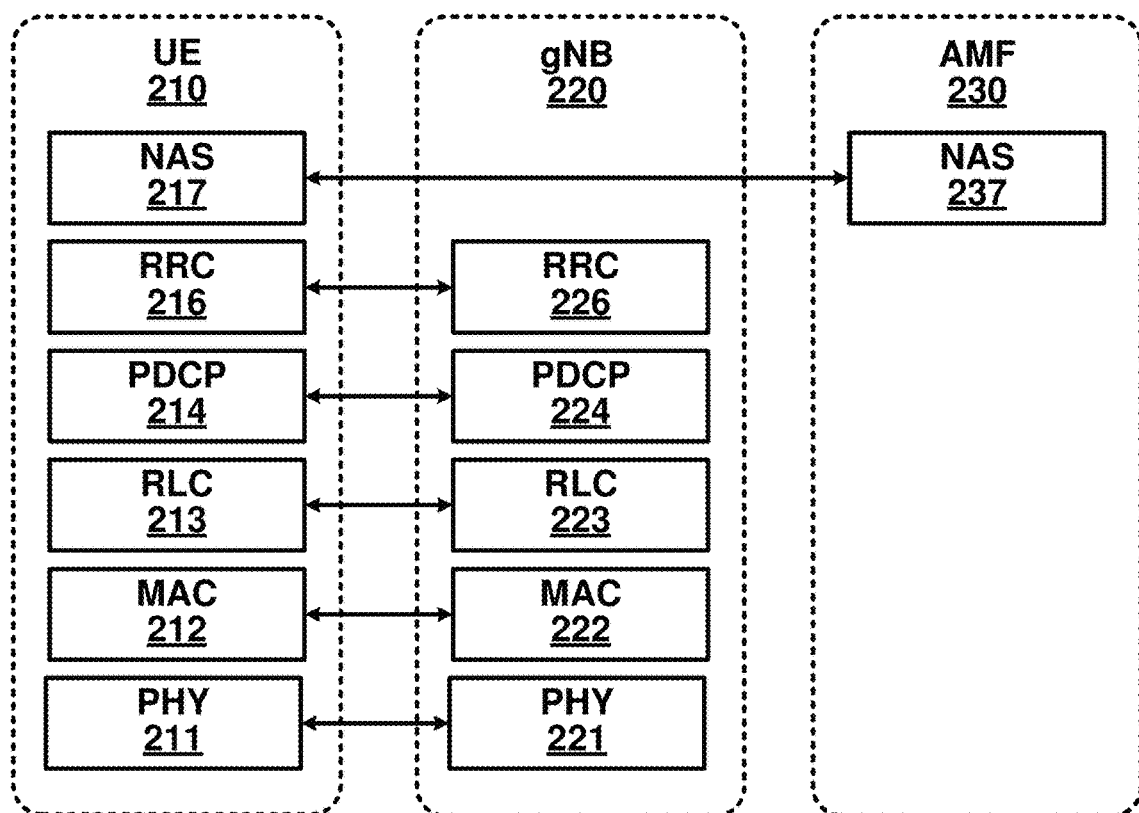

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
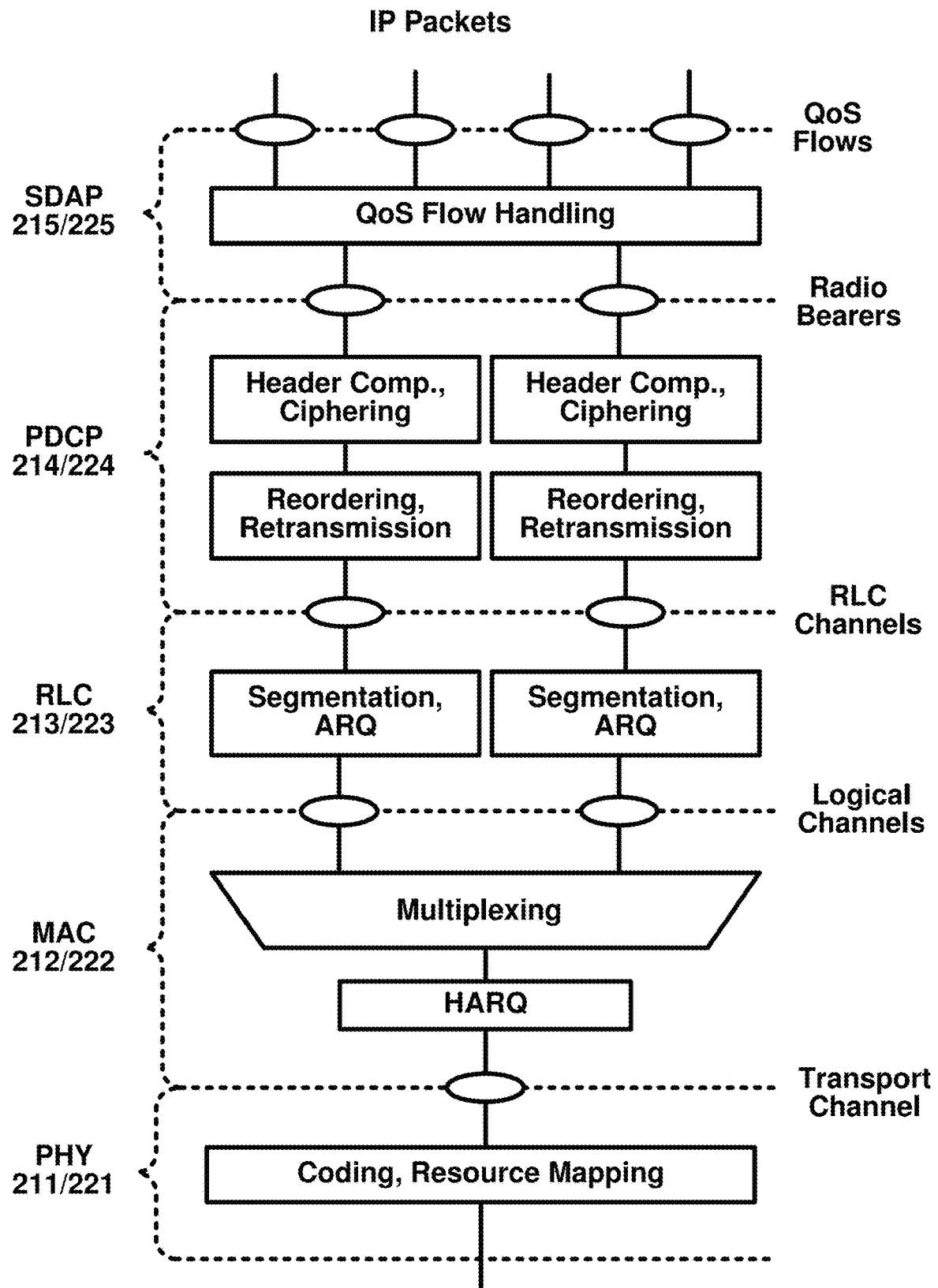
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TB s) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TB s at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
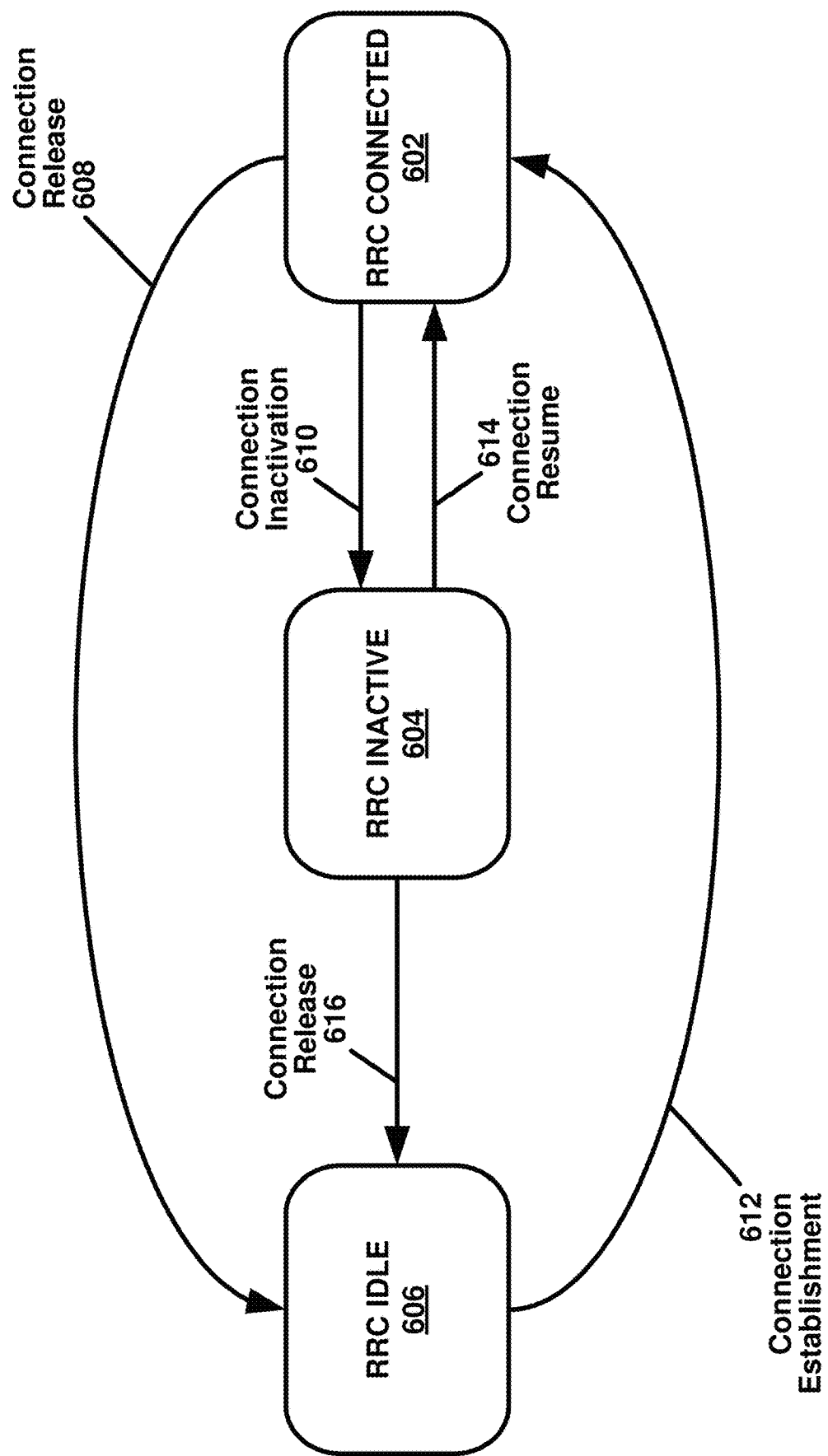
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNB s 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
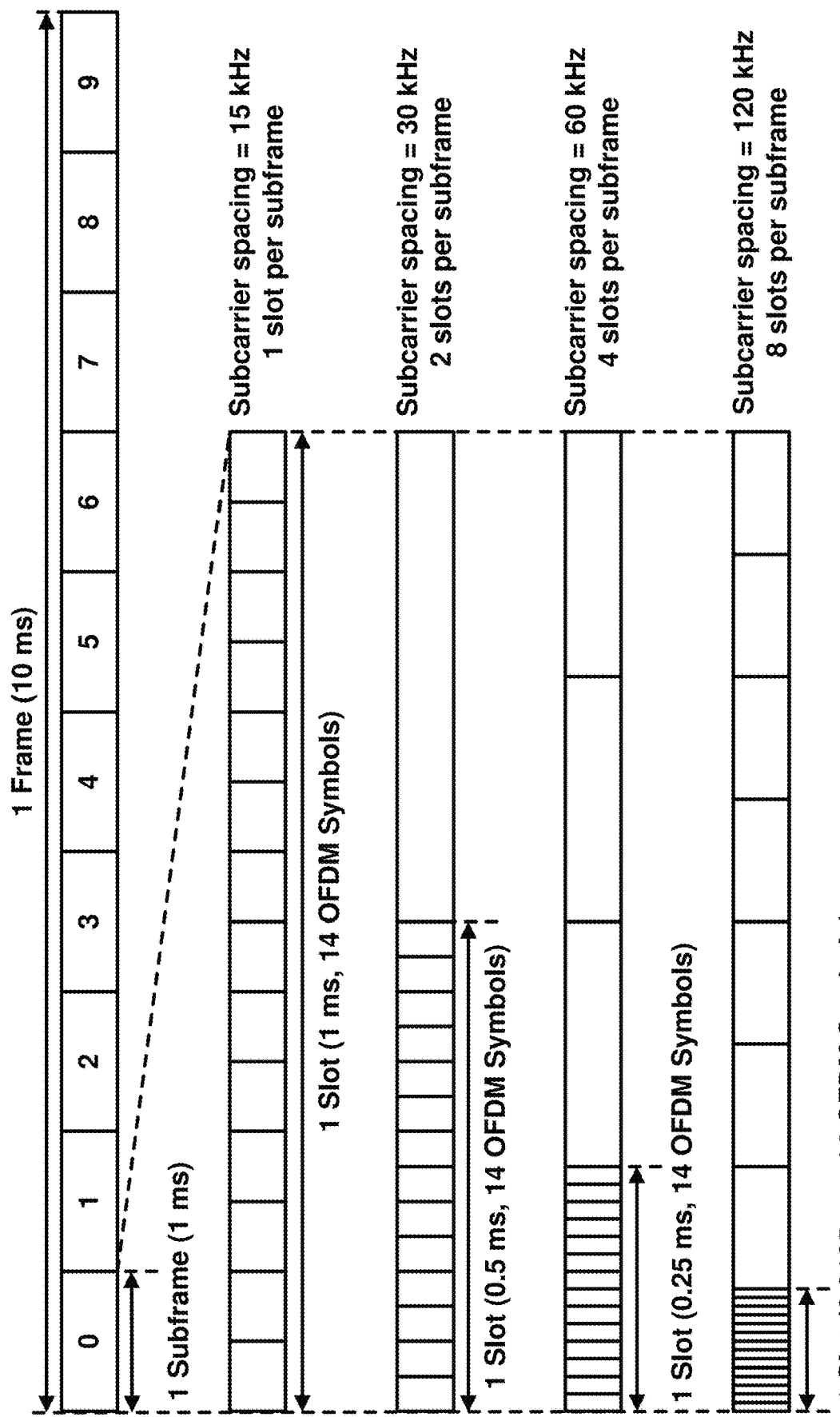
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/ cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
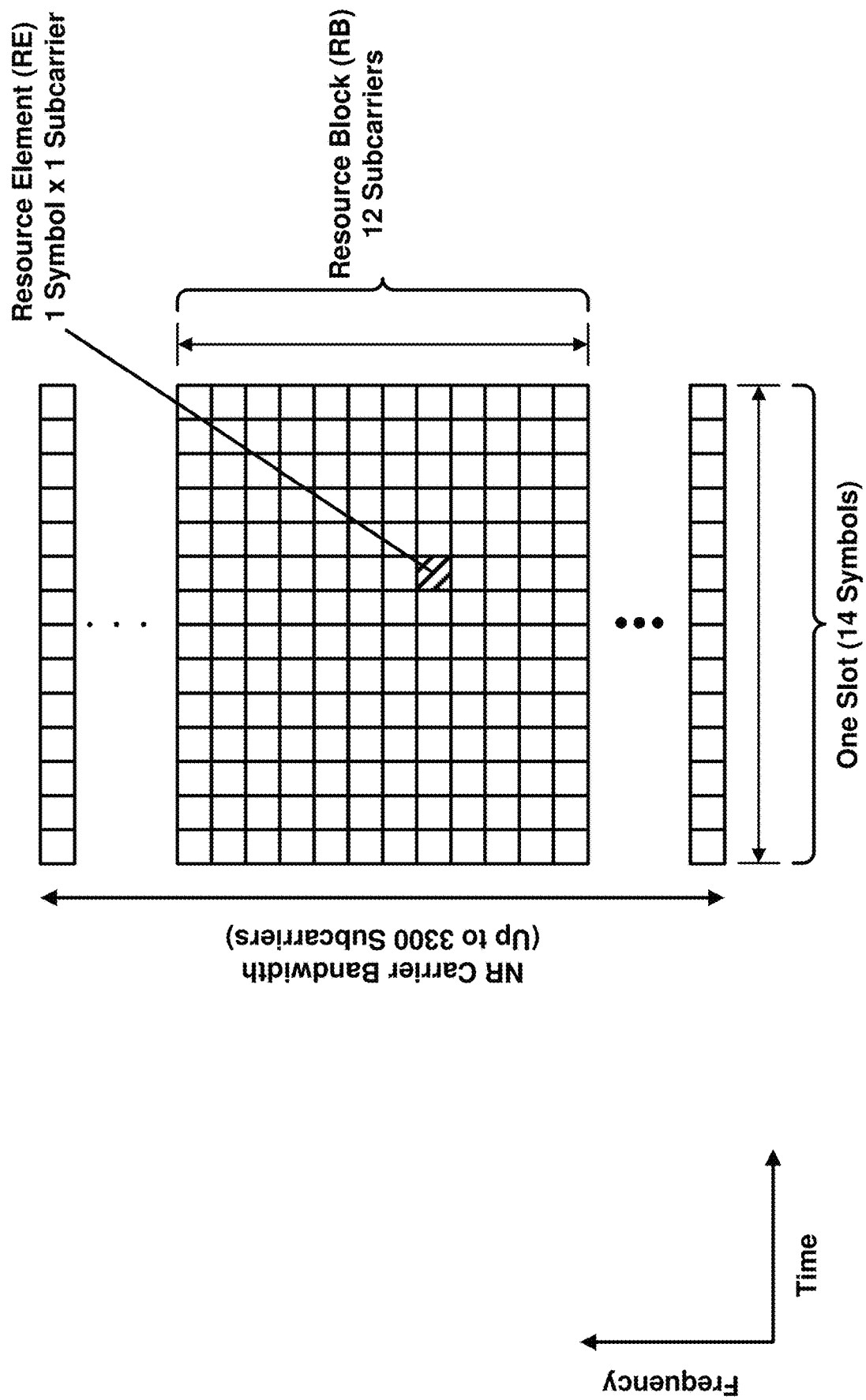
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
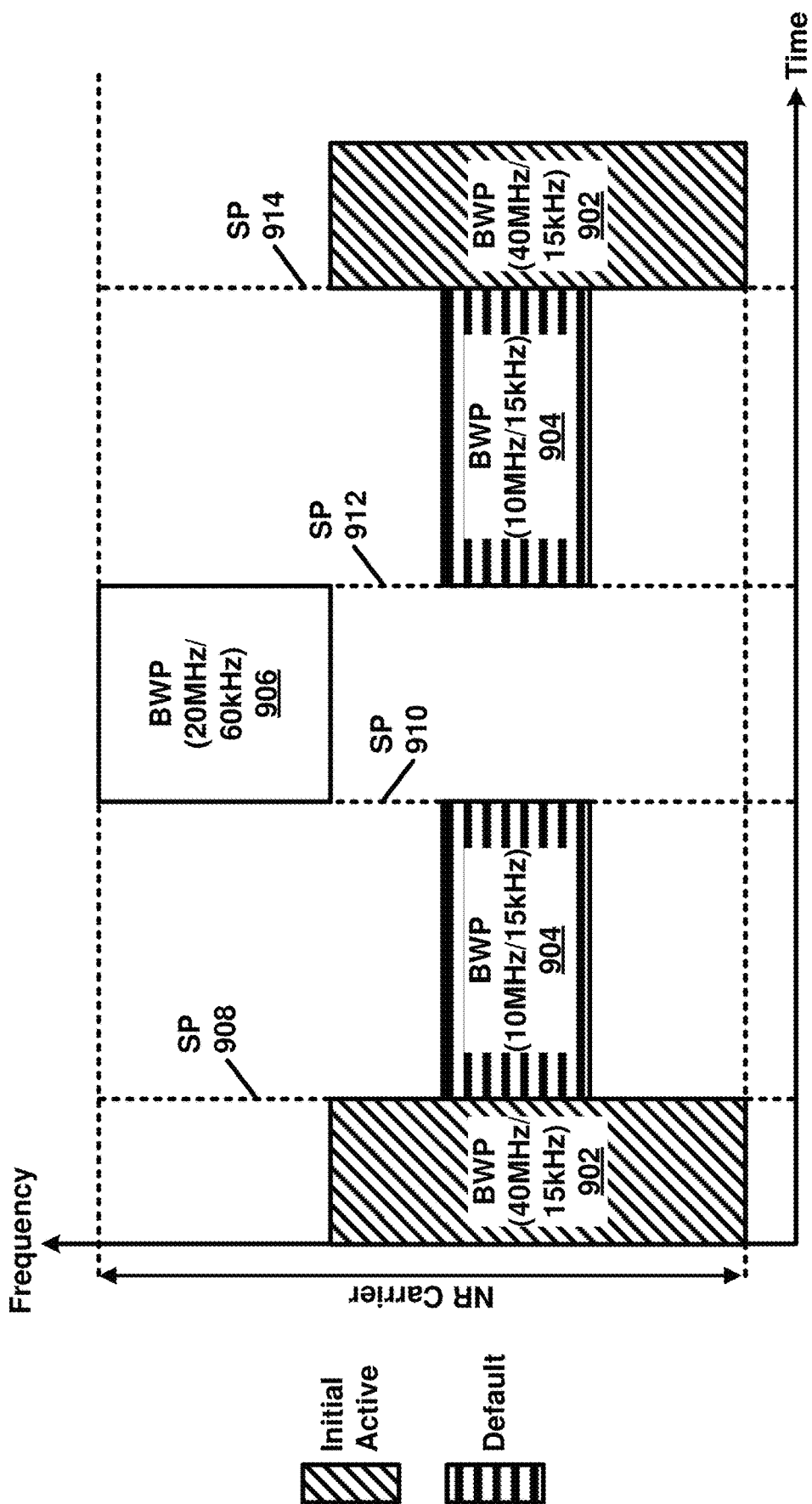
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
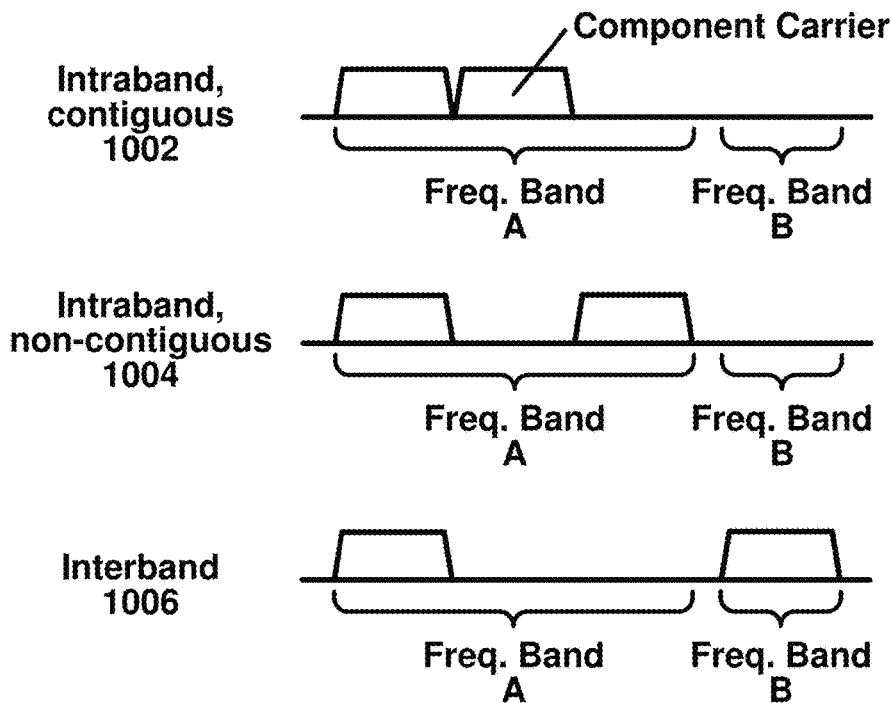
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
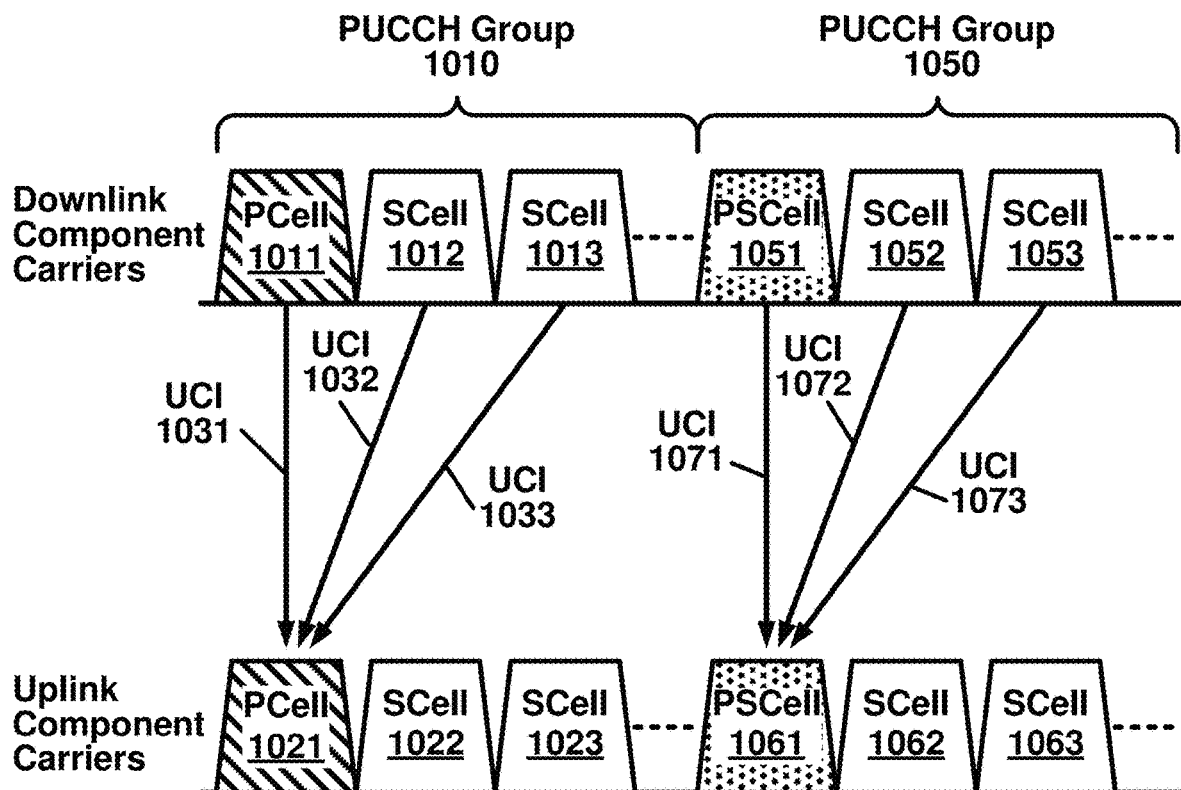
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
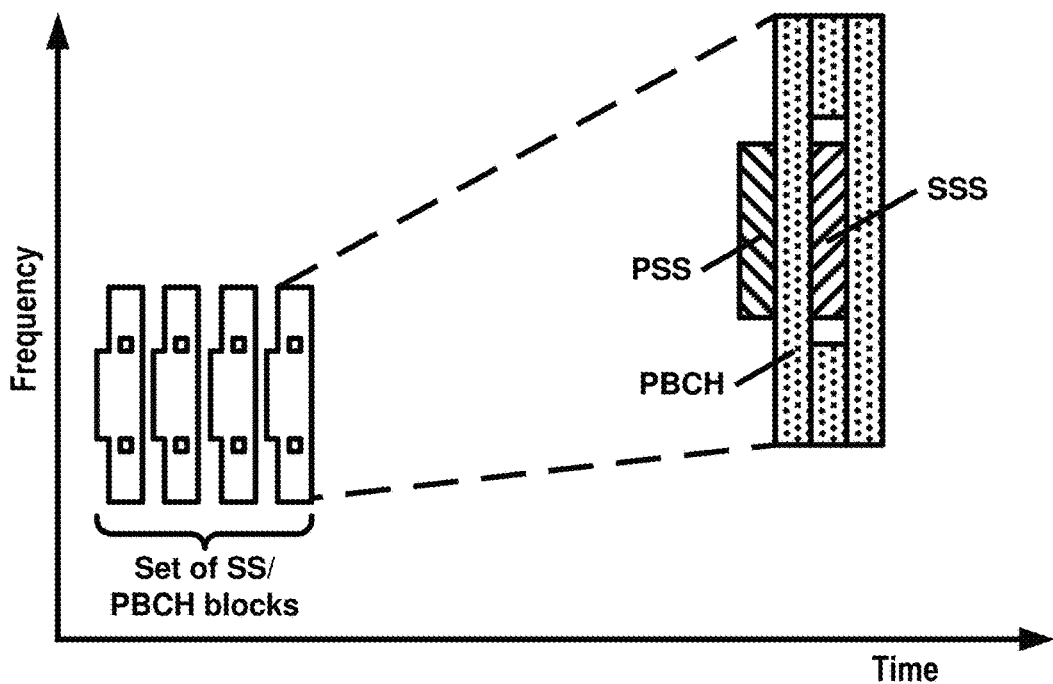
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RS s for channel estimation or any other suitable purpose. The base station may configure a UE with one or more of the same/similar CSI-RS s. The UE may measure the one or more CSI-RS s. The UE may estimate a downlink channel state and/or generate a CSI report based on the measuring of the one or more downlink CSI-RS s. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
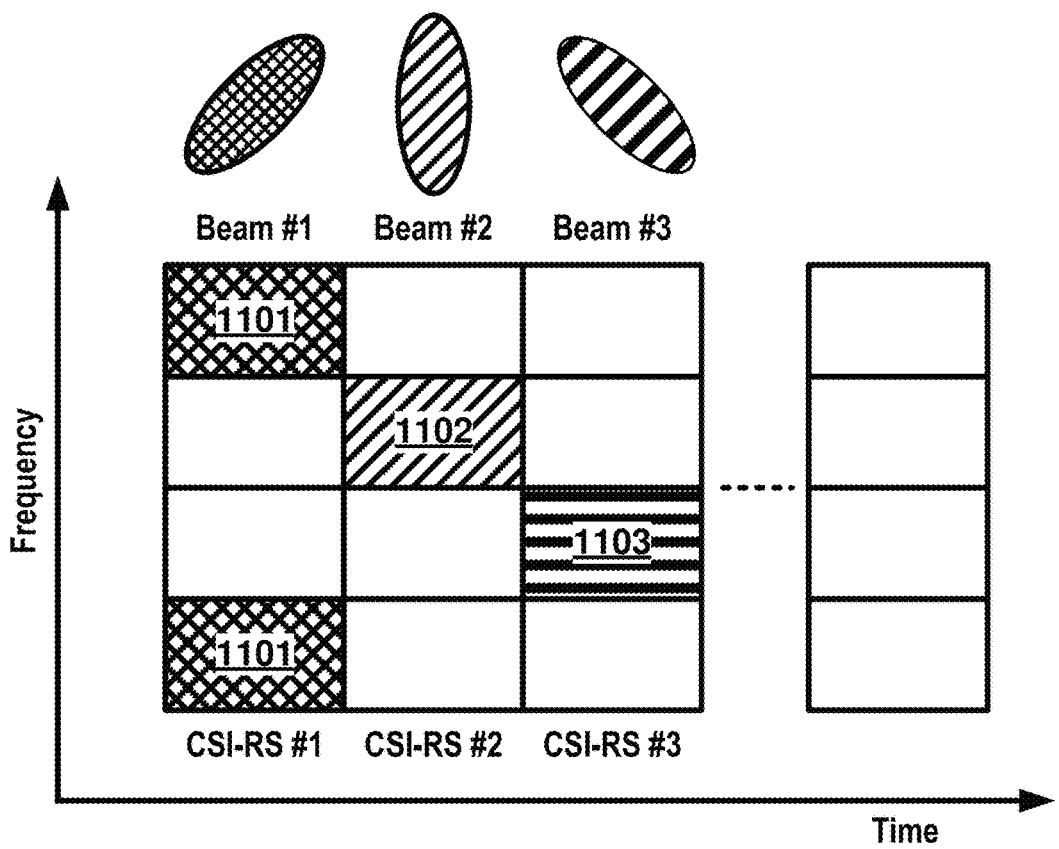
FIG. 11B illustrates an example of CSI-RS s that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RS s. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RS s such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RS s of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIB s) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
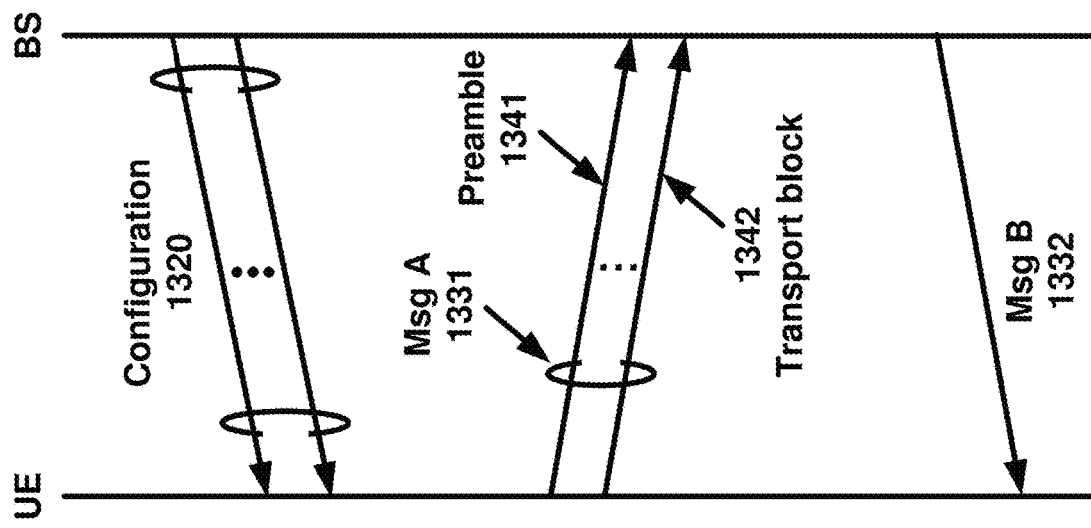
FIG. 13A, FIG. 13B, and FIG. 13C respectively illustrate a four-step contention-based random access procedure, a two-step contention-free random access procedure, and another two-step random access procedure.
Figure 13B:
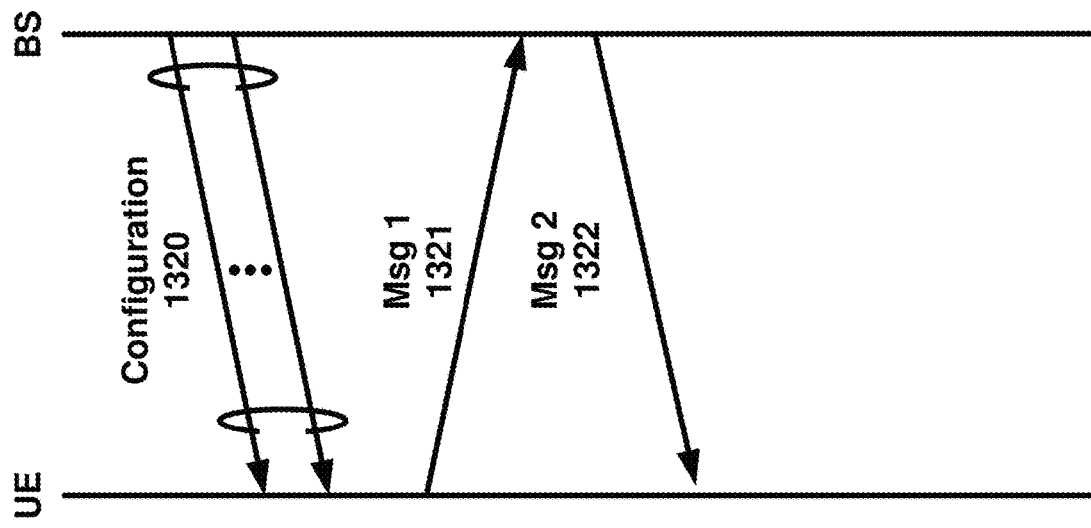
Figure 13A:
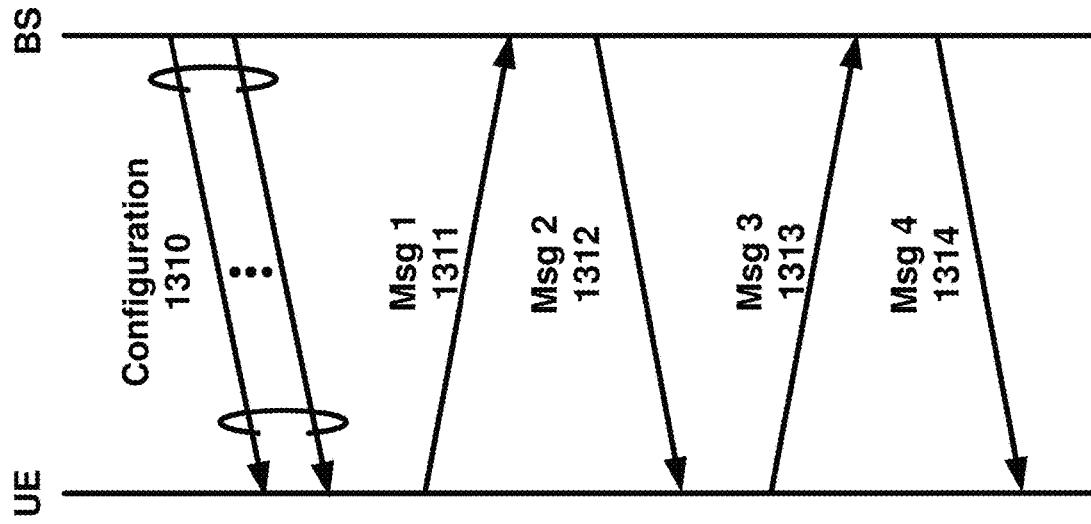

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RS s. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE TRANSMISSION COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
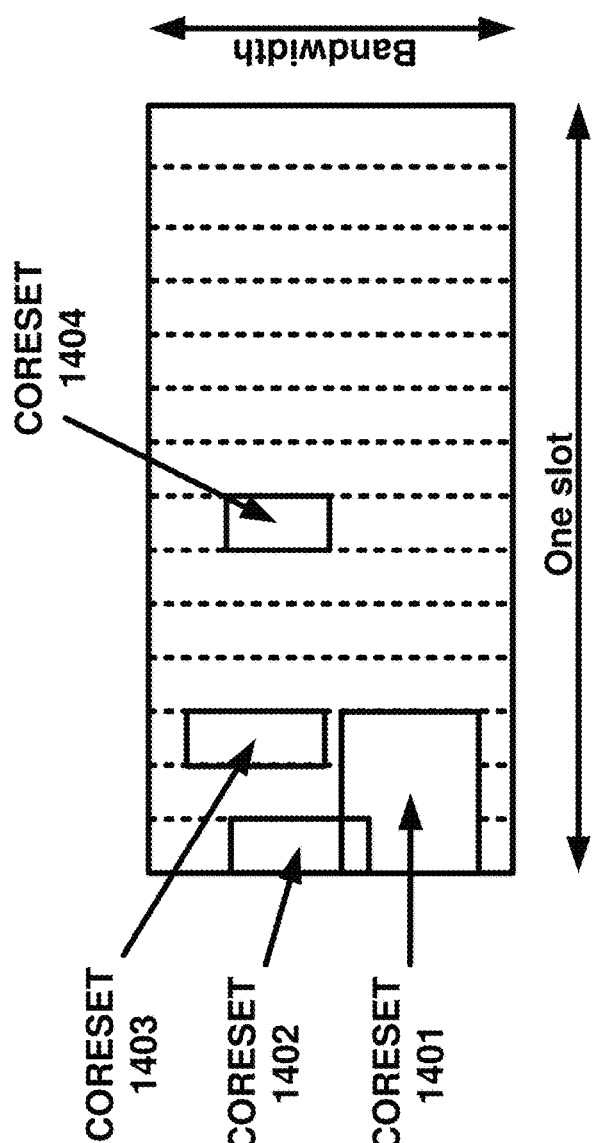
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
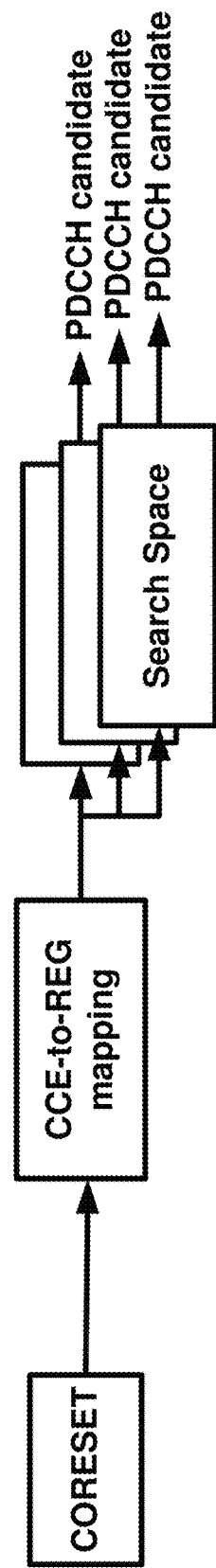
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
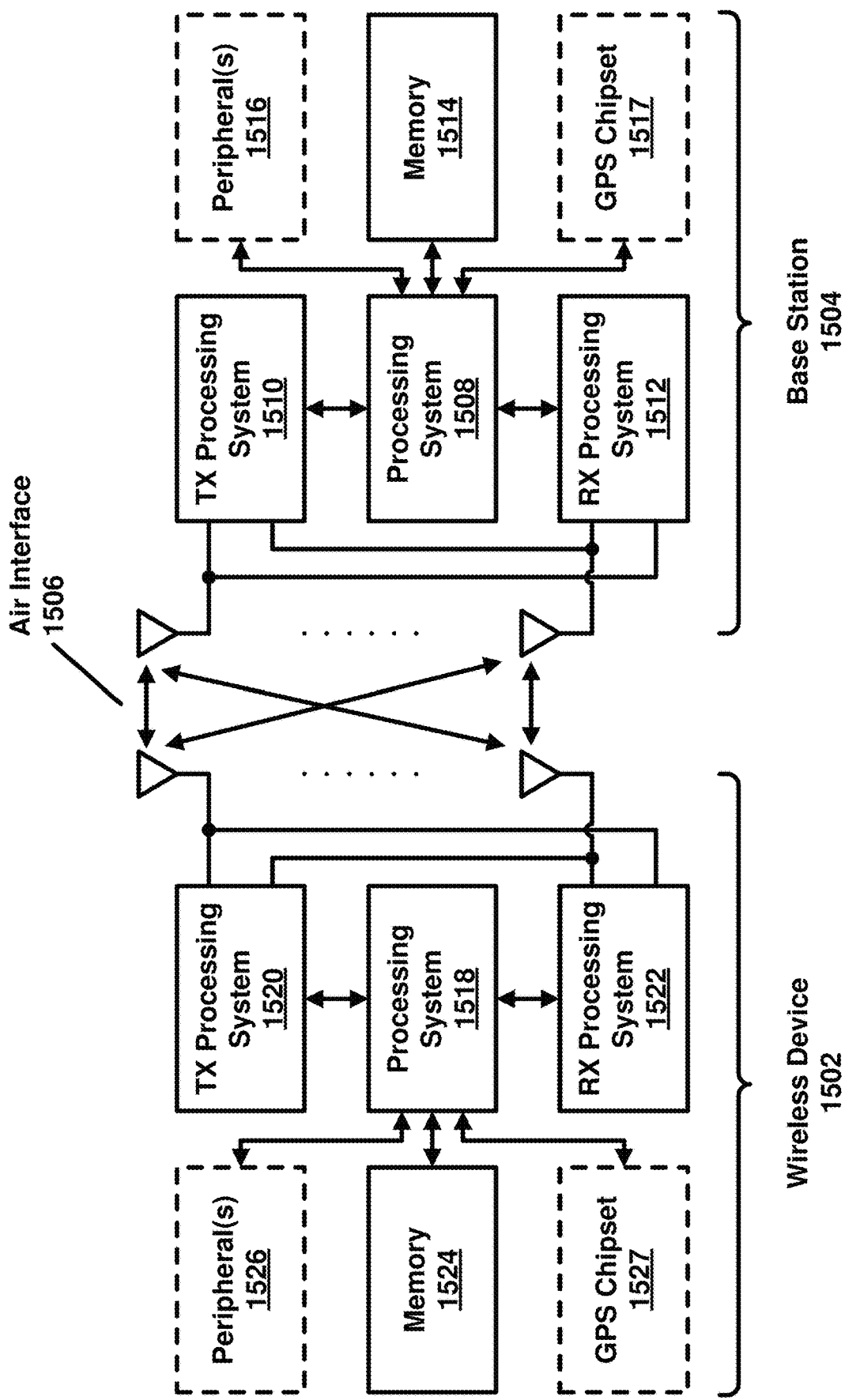
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP- OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/ window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one-bit length; an LCID field with a multi-bit length; an L field with a multi-bit length, or a combination thereof.

Figure 17A:
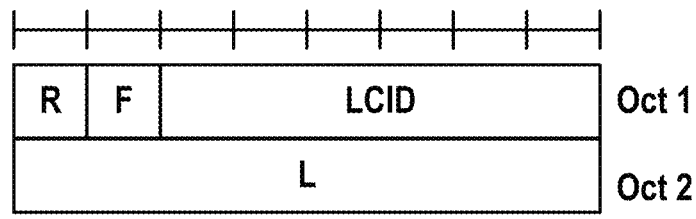
FIG. 17A, FIG. 17B and FIG. 17C illustrate examples of MAC subheaders, according to some embodiments.
Figure 17B:
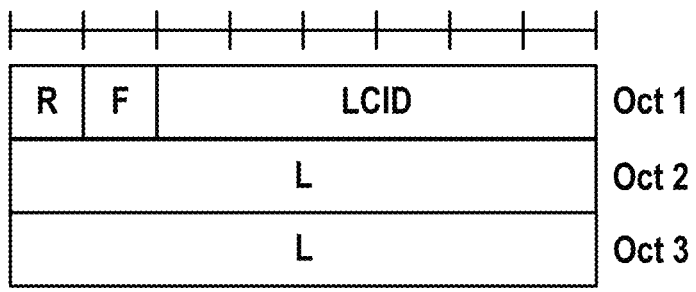
Figure 17C:
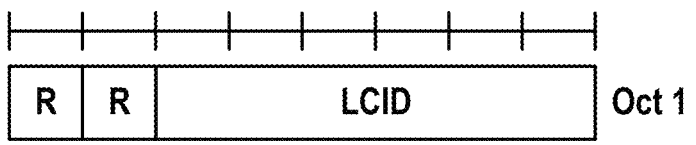

FIG. 17A shows an example of a MAC subheader with an R field, an F field, an LCID field, and an L field. In the example MAC subheader of FIG. 17A, the LCID field may be six bits in length, and the L field may be eight bits in length. FIG. 17B shows example of a MAC subheader with an R field, a F field, an LCID field, and an L field. In the example MAC subheader shown in FIG. 17B, the LCID field may be six bits in length, and the L field may be sixteen bits in length. When a MAC subheader corresponds to a fixed sized MAC CE or padding, the MAC subheader may comprise: an R field with a two-bit length and an LCID field with a multi-bit length. FIG. 17C shows an example of a MAC subheader with an R field and an LCID field. In the example MAC subheader shown in FIG. 17C, the LCID field may be six bits in length, and the R field may be two bits in length.

Figure 18A:
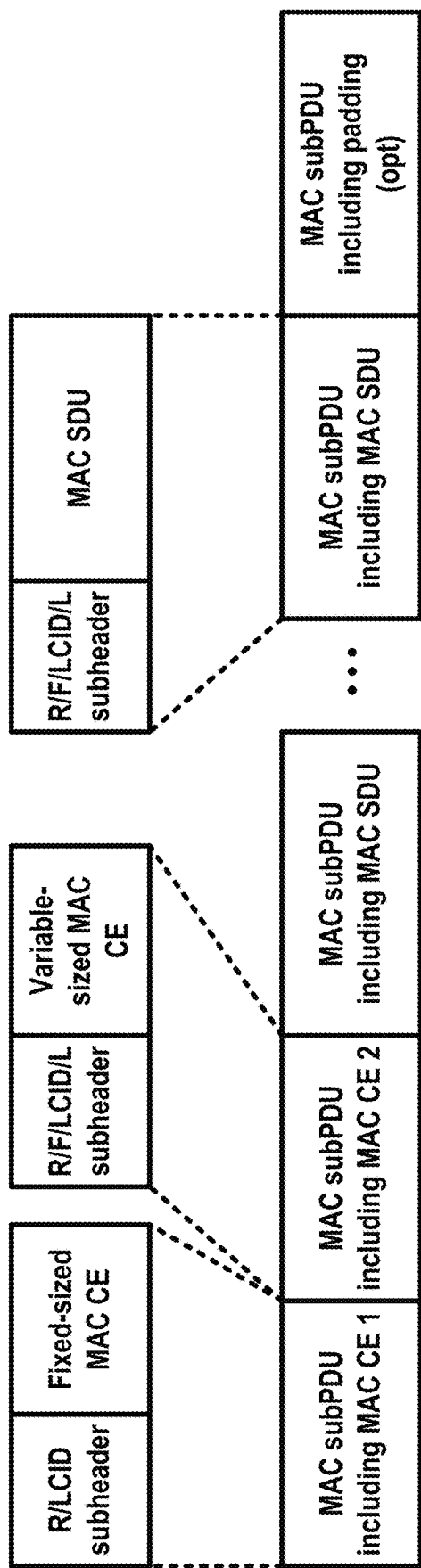
FIG. 18A illustrates an example of a DL MAC PDU, according to some embodiments.
Figure 18B:
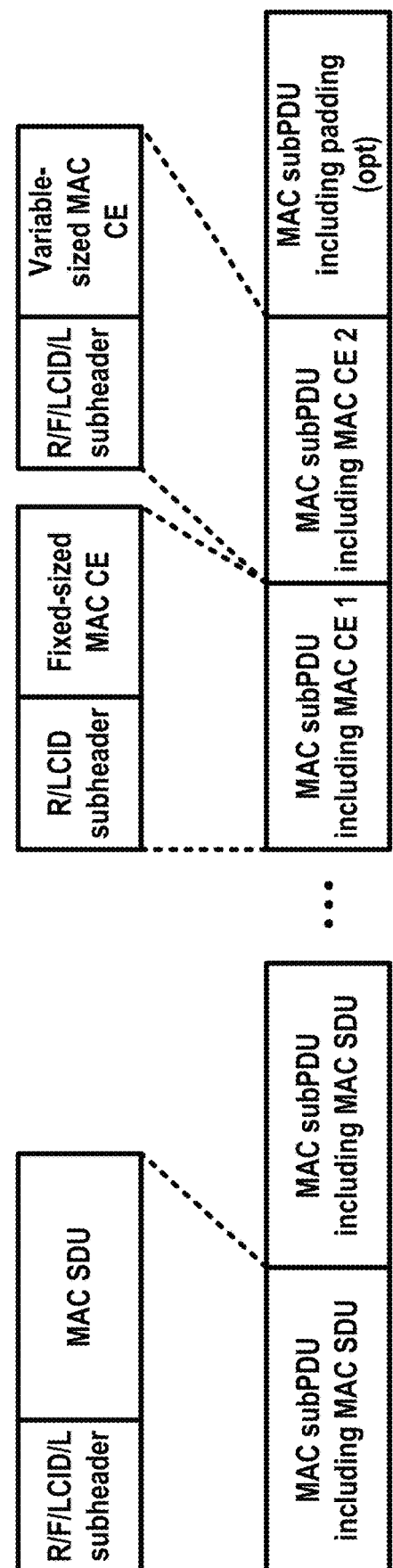
FIG. 18B illustrates an example of an UL MAC PDU, according to some embodiments.

FIG. 18A shows an example of a DL MAC PDU. Multiple MAC CEs, such as MAC CE 1 and 2, may be placed together. A MAC subPDU, comprising a MAC CE, may be placed before: a MAC subPDU comprising a MAC SDU, or a MAC subPDU comprising padding. FIG. 18B shows an example of a UL MAC PDU. Multiple MAC CEs, such as MAC CE 1 and 2, may be placed together. In an embodiment, a MAC subPDU comprising a MAC CE may be placed after all MAC subPDUs comprising a MAC SDU. In addition, the MAC subPDU may be placed before a MAC subPDU comprising padding.

In an example, a MAC entity of a base station may transmit one or more MAC CEs to a MAC entity of a wireless device. FIG. 19 shows an example of multiple LCIDs that may be associated with the one or more MAC CEs. The one or more MAC CEs comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the base station one or more MAC CEs. FIG. 20 shows an example of the one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an embodiment, a wireless device may support CA for contiguous CCs and/or for non-contiguous CCs. CCs may be organized into cells. For example, CCs may be organized into one primary cell (PCell) and one or more secondary cells (SCells). When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a base station may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a base station may activate or deactivate at least one of the one or more SCells. Upon configuration of an SCell, the SCell may be deactivated unless an SCell state associated with the SCell is set to "activated" or "dormant".

A wireless device may activate/deactivate an SCell in response to receiving an SCell Activation/Deactivation MAC CE. In an example, a base station may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell. In response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

When an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell. When at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell. In an example, when an SCell is deactivated, if there is an ongoing random access procedure on the SCell, a wireless device may abort the ongoing random access procedure on the SCell.

FIG. 21A shows an example of an SCell Activation/Deactivation MAC CE of one octet. A first MAC PDU subheader with a first LCID (e.g., '111010' as shown in FIG. 19) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one). FIG. 21B shows an example of an SCell Activation/Deactivation MAC CE of four octets. A second MAC PDU subheader with a second LCID (e.g., '111001' as shown in FIG. 19) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 21A and/or FIG. 21B, a C, field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 21A and FIG. 21B, an R field may indicate a reserved bit. The R field may be set to zero.

A base station may configure a wireless device with uplink (UL) bandwidth parts (BWPs) and downlink (DL) BWPs to enable bandwidth adaptation (BA) on a PCell. If carrier aggregation is configured, the base station may further configure the wireless device with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the wireless device to operate on the SCell upon the SCell being activated. In paired spectrum (e.g. FDD), a base station and/or a wireless device may independently switch a DL BWP and an UL BWP. In unpaired spectrum (e.g. TDD), a base station and/or a wireless device may simultaneously switch a DL BWP and an UL BWP.

In an example, a base station and/or a wireless device may switch a BWP between configured BWPs by means of a DCI or a BWP inactivity timer. When the BWP inactivity timer is configured for a serving cell, the base station and/or the wireless device may switch an active BWP to a default BWP in response to an expiry of the BWP inactivity timer associated with the serving cell. The default BWP may be configured by the network. In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve wireless device battery consumption. BWPs other than the one active UL BWP and the one active DL BWP that the wireless device may work on may be deactivated. On deactivated BWPs, the wireless device may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time. In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-InactivityTimer). In an example, the BWP switching may be controlled by a MAC entity in response to initiating a Random Access procedure. Upon addition of a serving cell (e.g., an SpCell) or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 22:
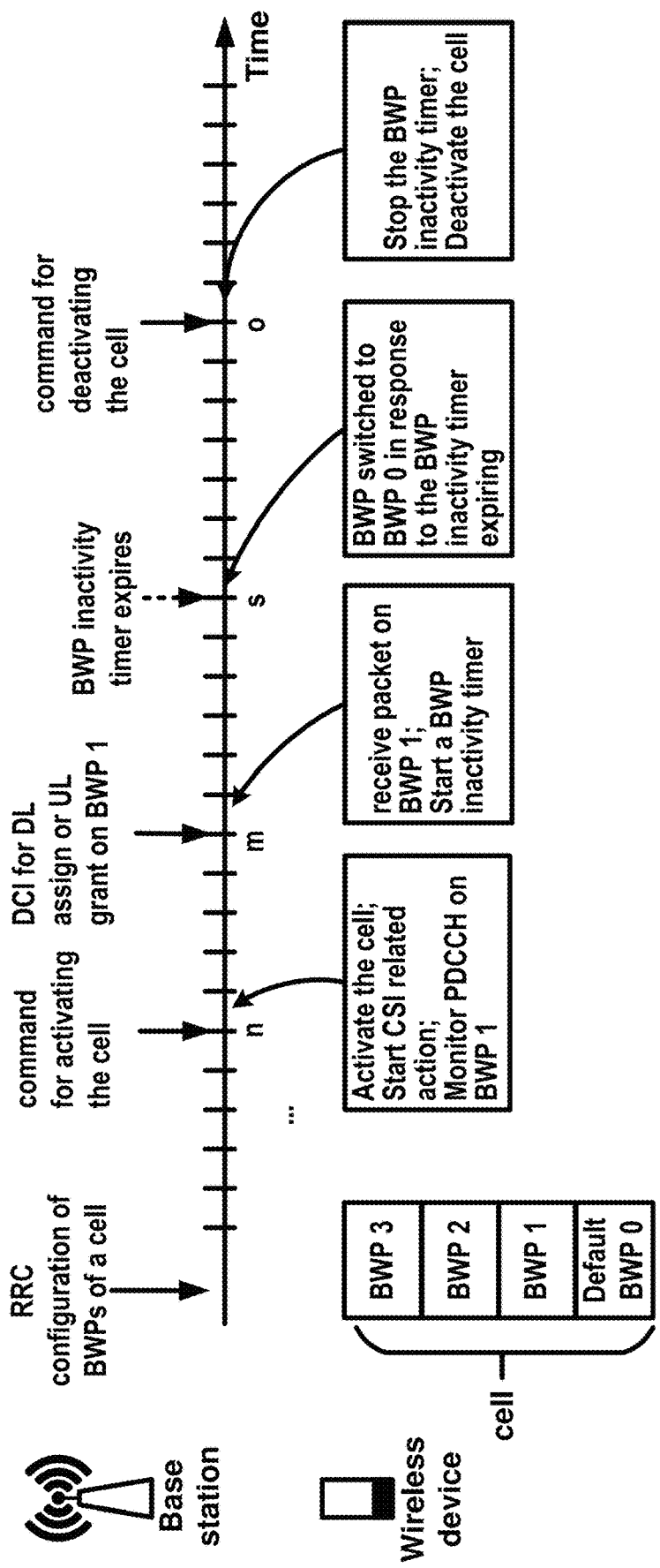
FIG. 22 illustrates an example of BWP activation/deactivation on a SCell, according to some embodiments.

FIG. 22 shows an example of BWP switching on a cell (e.g., PCell or SCell). In an example, a wireless device may receive from a base station at least one RRC message comprising parameters of a cell and one or more BWPs associated with the cell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1), one BWP as the default BWP (e.g., BWP 0). The wireless device may receive a command (e.g., RRC message, MAC CE or DCI) to activate the cell at an $n^{th}$ slot. The wireless device may start a cell deactivation timer (e.g., sCellDeactivationTimer), and start CSI related actions for the cell, and/or start CSI related actions for the first active BWP of the cell. The wireless device may start monitoring a PDCCH on BWP 1 in response to activating the cell.

In an example, the wireless device may start restart a BWP inactivity timer (e.g., bwp-InactivityTimer) at an $m^{th}$ slot in response to receiving a DCI indicating DL assignment on BWP 1. The wireless device may switch back to the default BWP (e.g., BWP 0) as an active BWP when the BWP inactivity timer expires, at an $s^{th}$ slot. The wireless device may deactivate the cell and/or stop the BWP inactivity timer when the sCellDeactivationTimer expires.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a wireless device may perform the BWP switching to a BWP indicated by the PDCCH. In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a wireless device may be provided by a higher layer parameter Default-DL-BWP a default DL BWP among the configured DL BWPs. If a wireless device is not provided a default DL BWP by the higher layer parameter Default-DL-BWP, the default DL BWP is the initial active DL BWP. In an example, a wireless device may be provided by higher layer parameter bwp-InactivityTimer, a timer value for the primary cell. If configured, the wireless device may increment the timer, if running, every interval of 1 millisecond for frequency range 1 or every 0.5 milliseconds for frequency range 2 if the wireless device may not detect a DCI format 1_1 for paired spectrum operation or if the wireless device may not detect a DCI format 1_1 or DCI format 0_1 for unpaired spectrum operation during the interval.

In an example, if a wireless device is configured for a secondary cell with higher layer parameter Default-DL-BWP indicating a default DL BWP among the configured DL BWPs and the wireless device is configured with higher layer parameter bwp-InactivityTimer indicating a timer value, the wireless device procedures on the secondary cell may be same as on the primary cell using the timer value for the secondary cell and the default DL BWP for the secondary cell.

In an example, if a wireless device is configured by higher layer parameter Active-BWP-DL-SCell a first active DL BWP and by higher layer parameter Active-BWP-UL-SCell a first active UL BWP on a secondary cell or carrier, the wireless device may use the indicated DL BWP and the indicated UL BWP on the secondary cell as the respective first active DL BWP and first active UL BWP on the secondary cell or carrier.

In an example, a set of PDCCH candidates for a wireless device to monitor is defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-Config-Common for a DCI format with CRC scrambled by a SI-RNTI on the primary cell of the MCG, a Type1-PDCCH CSS set configured by ra-SearchSpace in PDCCH-Config-Common for a DCI format with CRC scrambled by a RA-RNTI, a MsgB-RNTI, or a TC-RNTI on the primary cell, a Type2-PDCCH CSS set configured by paging-SearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In an example, a wireless device determines a PDCCH monitoring occasion on an active DL BWP based on one or more PDCCH configuration parameters comprising: a PDCCH monitoring periodicity, a PDCCH monitoring offset, and a PDCCH monitoring pattern within a slot. For a search space set (SS s), the wireless device determines that a PDCCH monitoring occasion(s) exists in a slot with number $n_{s,f}^{\mu}$ in a frame with number $n_f$ if $(n_f \cdot N_{slot}^{frame,\mu} + n_{s,f}^{\mu} - o_s) \bmod k_s = 0$. $N_{slot}^{frame,\mu}$ is a number of slots in a frame when numerology $\mu$ is configured. $o_s$ is a slot offset indicated in the PDCCH configuration parameters. $k_s$ is a PDCCH monitoring periodicity indicated in the PDCCH configuration parameters. The wireless device monitors PDCCH candidates for the search space set for $T_s$ consecutive slots, starting from slot $n_{s,f}^{\mu}$, and does not monitor PDCCH candidates for search space set s for the next $k_s - T_s$ consecutive slots. In an example, a USS at CCE aggregation level $L \in \{1, 2, 4, 8, 16\}$ is defined by a set of PDCCH candidates for CCE aggregation level L.

In an example, a wireless device decides, for a search space set s associated with CORESET p, CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ as $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i,$$

where, $Y_{p,n_{s,f}^{\mu}} = 0$ for any CSS; $Y_{p,n_{s,f}^{\mu}} = (A_p \cdot Y_{p,n_{s,f}^{\mu}-1}) \bmod D$ for a USS, $Y_{p,-1} = n_{RNTI} \neq 0$, $A_p = 39827$ for p mod 3=0, $A_p = 39829$ for p mod 3=1, $A_p = 39839$ for p mod 3=2, and D=65537; i=0, . . . , L−1; $N_{CCE,p}$ is the number of CCEs, numbered from 0 to $N_{CCE,p}-1$, in CORESET p; $n_{CI}$ is the carrier indicator field value if the wireless device is configured with a carrier indicator field by CrossCarrierSchedulingConfig for the serving cell on which PDCCH is monitored; otherwise, including for any CSS, $n_{CI}=0$; $m_{s,n_{CI}}=0$; $m_{s,n_{CI}}=0, \ldots, M_{s,n_{CI}}^{(L)}-1$, for aggregation level L of a search space set s for a serving cell corresponding to $n_{CI}$; for any CSS, $M_{s,max}^{(L)} = M_{s,0}^{(L)}$; for a USS, $M_{s,max}^{(L)}$ is the maximum of $M_{s,n_{CI}}^{(L)}$ over all configured n u values for a CCE aggregation level L of search space set s; and the RNTI value used for $n_{RNTI}$ is the C-RNTI.

In an example, a wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decoding may be referred to as blind decoding.

FIG. 23A shows an example of configuration parameters of a master information block (MIB) of a cell (e.g., PCell). In an example, a wireless device, based on receiving primary synchronization signal (PSS) and/or secondary synchronization signal (SSS), may receive a MIB via a PBCH. The configuration parameters of a MIB may comprise six bits (systemFrameNumber) of system frame number (SFN), subcarrier spacing indication (subCarrierSpacingCommon), a frequency domain offset (ssb-SubcarrierOffset) between SSB and overall resource block grid in number of subcarriers, an indication (cellBarred) indicating whether the cell is bared, a DMRS position indication (dmrs-TypeA-Position) indicating position of DMRS, parameters of CORESET and SS of a PDCCH (pdcch-ConfigSIB1) comprising a common CORESET, a common search space and necessary PDCCH parameters.

In an example, a pdcch-ConfigSIB1 may comprise a first parameter (e.g., controlResourceSetZero) indicating a common ControlResourceSet (CORESET) with ID #0 (e.g., CORESET #0) of an initial BWP of the cell. controlResourceSetZero may be an integer between 0 and 15. Each integer between 0 and 15 may identify a configuration of CORESET #0. FIG. 23B shows an example of a configuration of CORESET #0. As shown in FIG. 23B, based on a value of the integer of controlResourceSetZero, a wireless device may determine a SSB and CORESET #0 multiplexing pattern, a number of RBs for CORESET #0, a number of symbols for CORESET #0, a RB offset for CORESET #0.

In an example, a pdcch-ConfigSIB1 may comprise a second parameter (e.g., searchSpaceZero) common search space with ID #0 (e.g., SS #0) of the initial BWP of the cell. searchSpaceZero may be an integer between 0 and 15. Each integer between 0 and 15 may identify a configuration of SS #0. FIG. 23C shows an example of a configuration of SS #0. As shown in FIG. 23C, based on a value of the integer of searchSpaceZero, a wireless device may determine one or more parameters (e.g., O, M) for slot determination of PDCCH monitoring, a first symbol index for PDCCH monitoring and/or a number of search spaces per slot.

In an example, based on receiving a MIB, a wireless device may monitor PDCCH via SS #0 of CORESET #0 for receiving a DCI scheduling a system information block 1 (SIB1). The wireless device may receive the DCI with CRC scrambled with a system information radio network temporary identifier (SI-RNTI) dedicated for receiving the SIB1.

FIG. 24 shows an example of RRC configuration parameters of system information block (SIB). A SIB (e.g., SIB1) may contain information relevant to when evaluating if a wireless device is allowed to access a cell and may define scheduling of other system information. A SIB may contain radio resource configuration information that is common for all wireless devices and barring information applied to a unified access control. In an example, a base station may transmit to a wireless device (or a plurality of wireless devices) one or more SIB information. As shown in FIG. 24, parameters of the one or more SIB information may comprise: one or more parameters (e.g., cellSelectionInfo) for cell selection related to a serving cell, one or more configuration parameters of a serving cell (e.g., in ServingCellConfigCommonSIB IE), and one or more other parameters. The ServingCellConfigCommonSIB IE may comprise at least one of: common downlink parameters (e.g., in DownlinkConfigCommonSIB IE) of the serving cell, common uplink parameters (e.g., in UplinkConfigCommonSIB IE) of the serving cell, and other parameters.

In an example a DownlinkConfigCommonSIB IE may comprise parameters of an initial downlink BWP of the serving cell (e.g., SpCell). The parameters of the initial downlink BWP may be comprised in a BWP-DownlinkCommon IE (as shown in FIG. 25). The BWP-DownlinkCommon IE may be used to configure common parameters of a downlink BWP of the serving cell. The base station may configure the locationAndBandwidth so that the initial downlink BWP contains the entire CORESET #0 of this serving cell in the frequency domain. The wireless device may apply the locationAndBandwidth upon reception of this field (e.g. to determine the frequency position of signals described in relation to this locationAndBandwidth) but it keeps CORESET #0 until after reception of RRCSetupIRR-CResume/RRCReestablishment.

In an example, an UplinkConfigCommonSIB IE may comprise parameters of an initial uplink BWP of the serving cell (e.g., SpCell). The parameters of the initial uplink BWP may be comprised in a BWP-UplinkCommon IE. The BWP-UplinkCommon IE may be used to configure common parameters of an uplink BWP. The common parameters of an uplink BWP are "cell specific". The base station may ensure the necessary alignment with corresponding parameters of other wireless devices. The common parameters of the initial bandwidth part of the PCell may be provided via system information. For all other serving cells, the base station may provide the common parameters via dedicated signaling.

FIG. 25 shows an example of RRC configuration parameters (e.g., BWP-DownlinkCommon IE) in a of a downlink BWP of a serving cell. A base station may transmit to a wireless device (or a plurality of wireless devices) one or more configuration parameters of a downlink BWP (e.g., initial downlink BWP) of a serving cell. As shown in FIG. 25, the one or more configuration parameters of the downlink BWP may comprise: one or more generic BWP parameters of the downlink BWP, one or more cell specific parameters for PDCCH of the downlink BWP (e.g., in pdcch-ConfigCommon IE), one or more cell specific parameters for the PDSCH of this BWP (e.g., in pdsch-ConfigCommon IE), and one or mor other parameters. A pdcch-ConfigCommon IE may comprise parameters of COESET #0 (e.g., controlResourceSetZero) which can be used in any common or UE-specific search spaces. A value of the controlResourceSetZero may be interpreted like the corresponding bits in MIB pdcch-ConfigSIB1. A pdcch-ConfigCommon IE may comprise parameters (e.g., in common ControlResourceSet) of an additional common control resource set which may be configured and used for any common or UE-specific search space. If the network configures this field, it uses a ControlResourceSetId other than 0 for this ControlResourceSet. Parameters of a control resource set may be implemented as shown in FIG. 25. The network configures the common ControlResourceSet in SIB1 so that it is contained in the bandwidth of CORESET #0. A pdcch-ConfigCommon IE may comprise parameters (e.g., in commonSearchSpaceList) of a list of additional common search spaces. Parameters of a search space may be implemented based on example of FIG. 26. A pdcch-ConfigCommon IE may indicate, from a list of search spaces, a search space for paging (e.g., pagingSearchSpace), a search space for random access procedure (e.g., ra-SearchSpace), a search space for SIB1 message (e.g., searchSpaceSIB1), a common search space #0 (e.g., searchSpaceZero), and one or more other search spaces.

As shown in FIG. 25, a control resource set (CORESET) may be associated with a CORESET index (e.g., ControlResourceSetId). The CORESET index with a value of 0 may identify a common CORESET configured in MIB and in ServingCellConfigCommon (controlResourceSetZero) and may not be used in the ControlResourceSet IE. The CORESET index with other values may identify CORESETs configured by dedicated signaling or in SIB1. The control- ResourceSetId is unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET in number of symbols. In an example, as shown in FIG. 25, configuration parameters of a CORESET may comprise at least one of: frequency resource indication (e.g., frequencyDomainResources), a CCE-REG mapping type indicator (e.g., cce-REG-MappingType), a plurality of TCI states, an indicator indicating whether a TCI is present in a DCI, and the like. The frequency resource indication, comprising a number of bits (e.g., 45 bits), indicates frequency domain resources, each bit of the indication corresponding to a group of 6 RBs, with grouping starting from the first RB group in a BWP of a cell (e.g., SpCell, SCell). The first (left-most/most significant) bit corresponds to the first RB group in the BWP, and so on. A bit that is set to 1 indicates that an RB group, corresponding to the bit, belongs to the frequency domain resource of this CORESET. Bits corresponding to a group of RBs not fully contained in the BWP within which the CORESET is configured are set to zero.

FIG. 26 shows an example of configuration of a search space (e.g., SearchSpace IE). In an example, one or more search space configuration parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number of candidates for an aggregation level (nrofCandidates), and/or a SS type indicating a common SS type or a UE-specific SS type (searchSpaceType). The monitoring slot periodicity and offset parameter may indicate slots (e.g. in a radio frame) and slot offset (e.g., related to a starting of a radio frame) for PDCCH monitoring. The monitoring symbol indication may indicate on which symbol(s) of a slot a wireless device may monitor PDCCH on the SS. The control resource set ID may identify a control resource set on which a SS may be located.

Figure 27A:
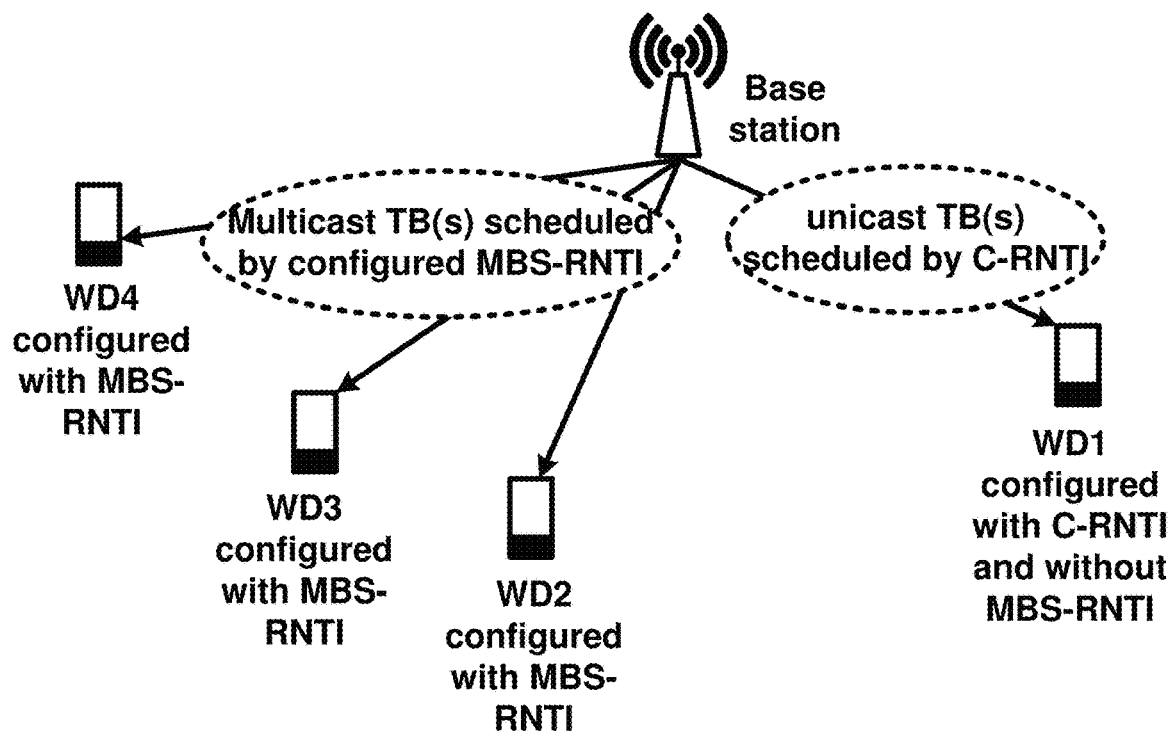
FIG. 27A and FIG. 27B illustrate example diagrams showing unicast, broadcast and multicast transmission, according to some embodiments.
Figure 27B:
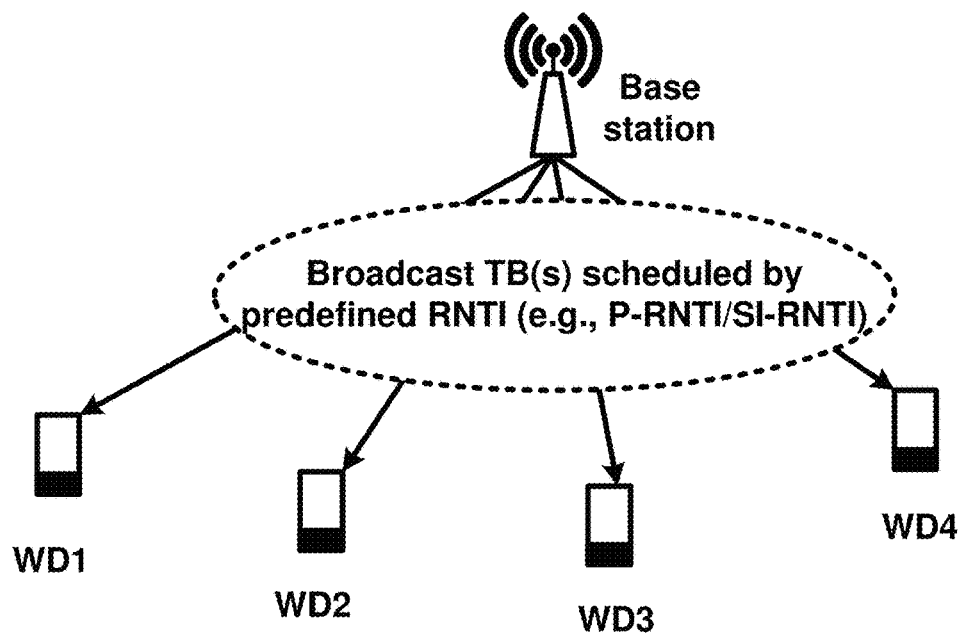

In an embodiment, a base station may transmit, or a wireless device may receive, a TB scheduled in a unicast transmission, a broadcast transmission, a multicast transmission, or a combination thereof. FIG. 27A and FIG. 27B shows examples of unicast transmission, broadcast transmission and multicast transmission.

As shown in FIG. 27A, a first wireless device (e.g., WD1) may receive from a base station transport blocks (TBs) dedicated for the first wireless device, and/or scheduled by a DCI with a first UE specific RNTI (e.g., C-RNTI, CS-RNTI, MCS-C-RNTI, etc.). In the example shown in FIG. 27A, second wireless devices (e.g., WD2, WD3, WD4 etc.) may not receive the TBs dedicated for the first wireless device because the second wireless devices are not configured with the first UE specific RNTI. In an example, TBs dedicated for a wireless device may be referred to as unicast TBs. A PDSCH carrying a TB dedicated for the wireless device may be referred to as a unicast PDSCH. A PDCCH (or a DCI) scheduling the dedicated TB may be referred to a unicast PDCCH (or a unicast DCI). In an example, transmitting a TB, to a wireless device and scheduled by a unicast DCI, may improve security and flexibility of the scheduling.

As shown in FIG. 27A, a wireless device may receive from a base station multicast TBs (or groupcast TBs), of a multicast service (e.g., MBS), which may be received by a group of wireless devices (e.g., WD2, WD3, WD4 etc.) in the coverage of the base station. To receive the multicast TBs, the group of wireless devices may be allocated/configured with a group dedicated RNTI (e.g., G-RNTI or SC-RNTI, or MBS-RNTI). Based on the configured group dedicated RNTI, the group of wireless devices may monitor PDCCH for receiving a DCI with CRC scrambled by the group dedicated RNTI, the DCI scheduling the multicast TBs. In an example, a wireless device (e.g., WD1) that is not configured with the group dedicated RNTI may not receive the multicast TBs. In an example, the MBS may carry message of applications comprising at least one of: V2X, public safety, live video (e.g., concert or sport), IOT software update, industry applications, etc. An MBS carrying a type of application data may be defined as an MBS session. Different MBS session may be used for different applications. A wireless device interested in the MBS provided by the base station may indicate to the base station that the wireless device is interested in the MBS service. The base station may accordingly transmit to the wireless device MBS configuration parameters comprising a RNTI dedicated for receiving DCI scheduling the MBS TBs. By allocating the dedicated RNTI to a wireless device for receiving the MBS, the base station may be aware of which wireless device, or how many wireless devices, subscribe to the MBS. The MBS is different from broadcast message where the base station does not know which wireless device, or how many wireless devices are receiving the broadcast message. In an example, a network operator may determine an MBS transmission strategy or price strategy based on a number of subscribers of the MBS by using the multicast/groupcast scheduling.

As shown in FIG. 27B, a wireless device may receive from a base station broadcast TBs which may be received by any wireless device in coverage of a base station. The broadcast TBs may comprise system information message, paging information message, etc. In an example, when receiving broadcast system information, or paging information, any wireless device in the cell may monitor a PDCCH for receiving a DCI with CRC scrambled by a predefined RNTI (e.g., SI-RNTI with predefined value as "FFFF" in hexa-decimal, or P-RNTI with predefined value as "FFFE" in hexa-decimal, etc.). Since the RNTIs, for receiving the DCI scheduling the broadcast message, are known (e.g., by being set to predefined value) to any wireless device in the cell, any wireless device may receive the broadcast message. In an example, by transmitting a system information or paging message scheduled by a broadcast scheduling DCI to a group of wireless devices, a base station may improve signaling efficiency for the base station.

In an embodiment, a base station may transmit, to a group of wireless devices, MBS TBs via a BWP from a plurality of BWPs of a cell.

Figure 28B:
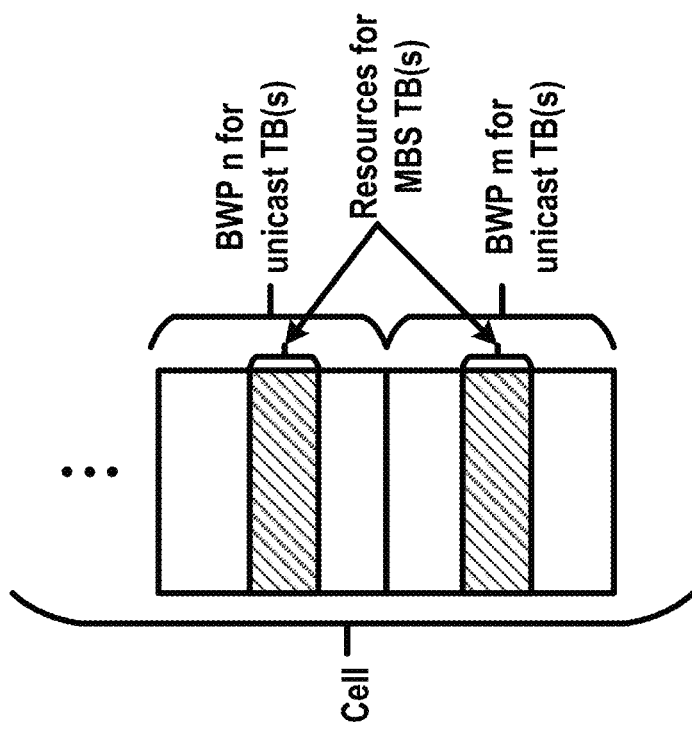
FIG. 28A and FIG. 28B illustrate examples of MBS resource allocations, according to some embodiments.
Figure 28A:
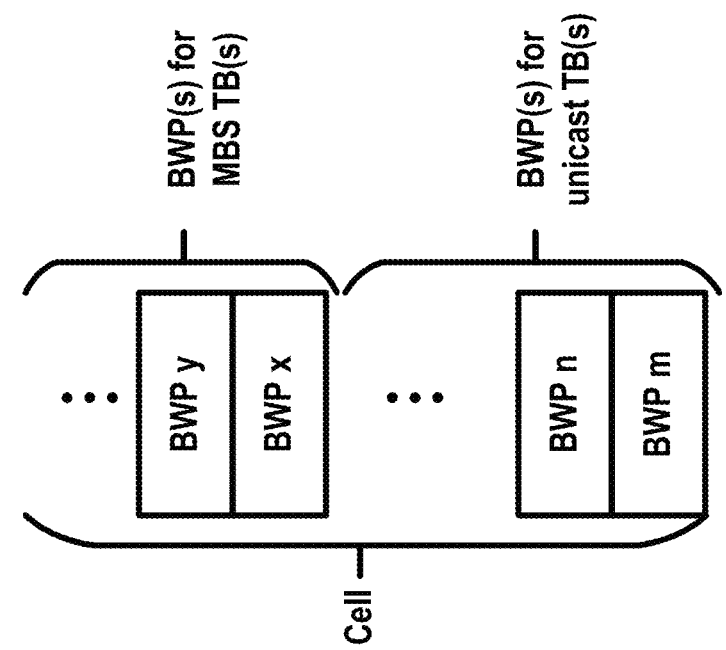

FIG. 28A and FIG. 28B are diagrams showing examples of MBS configurations when multiple BWPs are configured in a cell, according to some embodiments.

As shown in FIG. 28A, a BWP used for the transmission of MBS TBs (e.g., which may be referred to as MBS BWP in this specification) may be configured separately and/or independently from a BWP for transmission of unicast TBs and/or broadcast TBs (e.g., which may be referred to as unicast BWP in this specification). An MBS BWP in this specification may be defined as a BWP, of a cell, on which MBS PDCCH/PDSCH may be transmitted. A unicast BWP in this specification may be defined as a BWP, of a cell, on which unicast PDCCH/PDSCH (and/or broadcast PDCCH/PDSCH) may be transmitted.

In an embodiment, a base station may transmit to a wireless device one or more RRC messages comprising configuration parameters of a cell comprising a plurality of BWPs. For example, the one or more RRC messages may indicate that a first set of BWPs from the plurality of BWPs are dedicated as unicast BWPs (e.g., BWP n, BWP m, etc., used for unicast PDCCH/PDSCH transmission, or broadcast system information transmission, or broadcast paging message transmission). In an example, the one or more RRC messages may indicate that a second set of BWPs from the plurality of BWPs are dedicated as MBS BWPs (e.g., BWP x, BWP y, etc., used for MBS PDCCH/PDSCH transmission). In an embodiment, different MBS (e.g., V2X, public safety, live video, IOT software update, industry applications, etc.), targeting different groups of wireless devices, may be configured on different BWPs. An MBS BWP may be used for transmission of different MBS TBs associated with different MBS configurations (e.g., V2X, public safety, live video, IOT software update, industry applications, etc.). In an example, configuring separate BWP(s) for MBS from unicast BWP may improve system throughput and reduce scheduling limitation/impact on the unicast PDSCH scheduling. In an embodiment, by supporting configuring the separate BWP for MBS, a wireless device may be required to support multiple active BWPs in a cell.

As shown in FIG. 28B, frequency resources used for the transmission of MBS TBs may be configured within a BWP for transmission of unicast TBs and/or broadcast TBs. The frequency resources configured in the BWP may be resource blocks common to a group of wireless devices configured with the MBS. The BWP may be an initial BWP of a cell, or a first active BWP configured on the cell. The BWP may be any BWP, except a dormant BWP of the cell. In an embodiment, a number of frequency resource blocks within a unicast BWP may be dedicated for transmission of MBS PDCCH/PDSCH to a group of wireless devices. In an example, the number of frequency resource blocks (or a set of frequency resource blocks) and locations of those frequency resource blocks within the BWP may be configured by the base station in the one or more RRC messages. The one or more RRC messages may further indicate configuration parameters of PDCCH for the MBS (e.g., referred to as MBS PDCCH), where the MBS PDCCH may carry a DCI with CRC scrambled by an MBS specific RNTI (e.g., MBS-RNTI, SC-RNTI, G-RNTI, etc.). The configuration parameters may indicate frequency resource allocation and time domain allocation of a search space and/or a CORESET for reception of the MBS PDCCH) within bandwidth of the unicast BWP. In an example, frequency resource allocation and time domain allocation of a search space and/or a CORESET may be implemented based on examples of FIG. 25 and/or FIG. 26.

In an embodiment, different MBS, targeting to different groups of wireless devices, may be configured on different sets of frequency resource blocks within a unicast BWP. As shown in FIG. 28B, frequency resource blocks for an MBS may be allocated on different unicast BWPs. In an example, configuring frequency resources for MBS within unicast BWP may simplify implementation of a wireless device and reduce power consumption of a wireless device. In an example, by supporting configuring the frequency resource for MBS within the unicast BWP, a wireless device may be required to support a single active BWP in a cell.

In existing technologies, a wireless device may start monitoring PDCCH, for receiving a DCI scheduling MBS TBs, when the wireless device is configured with the MBS. In an example, the wireless device may be configured with a cell comprising multiple BWPs, which may comprise an active BWP. The wireless device, using existing technologies, may not monitor the PDCCH, for receiving the DCI scheduling the MBS TBs on a BWP, when the BWP is not yet activated. The wireless device may expect a BWP activation command for the MBS. Using existing technologies, the wireless device may not activate the BWP by itself before receiving a BWP activation command. The wireless device may start monitoring the PDCCH after receiving the BWP activation command. However, the base station may not be aware of the situation that the wireless device is expecting the BWP activation command for the MBS. This may result in MBS transmission delay when the wireless device is configured with multiple BWPs in a cell and the wireless device supports reception of MBS TBs. There is a need to improve BWP management for MBS transmission when multiple BWPs are configured in a cell.

In existing technologies, a wireless device may start or restart a BWP inactivity timer (e.g., bwp-InactivityTimer) associated with an active DL BWP of a cell if the wireless device receives a DCI addressed to C-RNTI (or MCS-C-RNTI or CS-RNTI) that indicates downlink assignment or uplink grant on/for the active BWP (e.g., as described with respect to the example shown in FIG. 22). The wireless device may not start the BWP inactivity timer (or may keep running the BWP inactivity timer) if a PDCCH addressed to a predefined RNTI (e.g., P-RNTI or SI-RNTI) indicating downlink assignment of a broadcast TB is received on the active BWP.

In an example, an MBS TB may be different from a unicast TB or a broadcast TB. An MBS TB may be transmitted unlike a unicast TB (e.g., with C-RNTI) to a single wireless device. An MBS TB may be transmitted unlike a broadcast TB (e.g., with predefined P-RNTI/SI-RNTI) to a group of wireless devices. An MBS TB may be transmitted to a group of wireless devices who subscribe to the MBS. When the group of wireless devices subscribe to the MBS, the base station may configure the group of wireless devices with an MBS dedicated RNTI. In an example, an MBS TB may be required to be retransmitted when the wireless device does not successfully decode the MBS TB and when the wireless device transmits a HARQ feedback indicating the decoding is unsuccessful. Compared with an MBS TB, a broadcast TB may not be required to be retransmitted when the wireless device does not successfully decode the broadcast TB. The wireless device may not transmit a HARQ feedback indicating that the decoding of the broadcast TB is unsuccessful. The wireless device, based on existing technologies, may not be able to manage the BWP inactivity timer efficiently when an MBS BWP is configured independently of a unicast BWP or when MBS resources are configured within a unicast BWP. There is a need to improve BWP state management when MBS is supported in a system.

In existing technologies, a wireless device may activate at most one BWP in a cell for PDSCH reception. In an example, a wireless device, when supporting V2X transmission on uplink radio resource of a system, may activate a second uplink BWP for V2X transmission between a Tx UE and a Rx UE in addition to activating a first uplink BWP for data transmission via Uu interface between a base station and a Tx UE. In this example, the first uplink BWP and the second uplink BWP are in a same cell and have the same numerology. The wireless device may maintain a single downlink active BWP in a cell when the wireless device is communicating with a base station via a Uu interface on a first uplink BWP in the cell and is communicating with a second wireless device via a sidelink on a second uplink BWP in the cell. The wireless device, by using existing technologies, may not be able to support multiple downlink active BWPs including, for example, a first active BWP for unicast PDSCH transmission from the base station to the wireless device and a second active BWP for MBS PDSCH transmission from the base station to the wireless device. There is a need to improve MBS transmission efficiency while maintaining ease of implementation without introducing significant overhead and complexity.

In an example embodiment, to improve BWP state management, a wireless device may receive, from a base station, one or more RRC messages comprising configuration parameters of an MBS session on one or more BWPs of a cell from a plurality of cells. The one or more RRC messages may include a system information message (e.g., SIB 1, SIB 2, etc.), which may be transmitted (or broadcasted) to a group of wireless devices comprising the wireless device. The one or more RRC messages may be a cell specific message or a UE specific message dedicated to the wireless device.

In an example, a cell configured with the MBS session may be a PCell, or a PSCell. The cell may be a SCell. In an example, the MBS session may be configured only on a PCell (or a PSCell). In an example, the MBS session may be configured on a PCell (or a PSCell), a SCell(s), or both the PCell (or PSCell) and the SCell(s).

In an example embodiment, the wireless device may transmit to the base station an MBS indication message (e.g., an MBS interest indication message, an MBS activation message, or an MBS request message, etc.) indicating the wireless device is interested in (or is subscribing to) the MBS session. The MBS indication message may comprise a RRC message, a MAC CE, or UCI via a PUCCH/PUSCH. The base station may transmit to the wireless device an acknowledgement as a response to the MBS indication message. The acknowledgement may comprise a RRC message, a MAC CE, or DCI(s) via a PDCCH. The wireless device, in response to receiving the acknowledgement from the base station, may activate the one or more BWPs configured with the MBS session. The wireless device may maintain the one or more BWPs configured with the MBS session in a deactivated state before receiving the acknowledgement from the base station. The wireless device may manage the one or more BWPs (e.g., configured with the MBS session) and unicast BWPs separately and/or independently in a cell. The wireless device may activate/deactivate a unicast BWP, as described above with respect to FIG. 22.

In an example embodiment, a wireless device may transmit, to a base station, an MBS indication message (e.g., an MBS interest indication message, an MBS activation message, or an MBS request message, etc.) indicating the wireless device is not interested in (or is not subscribing to) the MBS session. The base station may transmit to the wireless device an acknowledgement as a response to the MBS indication message. The wireless device, in response to receiving the acknowledgement from the base station, may deactivate the one or more BWPs configured with the MBS session. The wireless device may manage the one or more BWPs (e.g., configured with the MBS session) and unicast BWPs separately and/or independently in a cell. The wireless device may activate/deactivate a unicast BWP, as described above with respect to FIG. 22.

According to an example embodiment, a BWP inactivity timer may be started/restarted for an active BWP in response to a wireless device receiving a DCI (via a PDCCH), addressed to an MBS dedicated RNTI (e.g., with CRC scrambled by the MBS dedicated RNTI), indicating downlink assignment for a TB that is transmitted via the BWP of a cell and that is transmitted to a group of wireless devices configured with the MBS dedicated RNTI. The MBS dedicated RNTI may be different from a C-RNTI identifying the specific wireless device. The wireless device may receive one or more RRC messages comprising configuration parameters of an MBS session and the configuration parameters may comprise the MBS dedicated RNTI associated with the MBS session.

According to an example embodiment, a wireless device may receive, from a base station, one or more RRC messages comprising configuration parameters comprising an MBS timer (e.g., an MBS inactivity timer, or an MBS deactivation timer, or an MBS dedicated BWP inactivity timer, etc.) on a cell. The MBS timer may be independently or separately configured from a BWP inactivity timer of the cell, a DRX timer (e.g., a DRX on duration timer, a DRX inactivity timer etc.), or a SCell deactivation timer of the cell. The wireless device may start or restart the MBS timer in response to receiving a DCI with CRC scrambled by the MBS dedicated RNTI via a PDCCH resource, and/or in response to receiving a TB scheduled by the DCI and scrambled by the MBS dedicated RNTI via a PDSCH resource. In response to an expiry of the MBS timer for the MBS session, the wireless device may deactivate the BWP on which the MBS session is configured and/or maintain an active BWP for unicast transmission while the BWP inactivity timer is running on the cell. In response to an expiry of the MBS timer for the MBS session, the wireless device may deactivate the cell on which the MBS session is configured.

In an example embodiment, an MBS dedicated downlink BWP in a cell may be activated in response to a numerology of the MBS dedicated downlink BWP being the same as an active downlink BWP in the cell for unicast PDSCH transmission. In an example embodiment, the MBS dedicated downlink BWP in the cell may be deactivated in response to a numerology of the MBS dedicated downlink BWP being different from the active downlink BWP in the cell for unicast PDSCH transmission.

Figure 29:
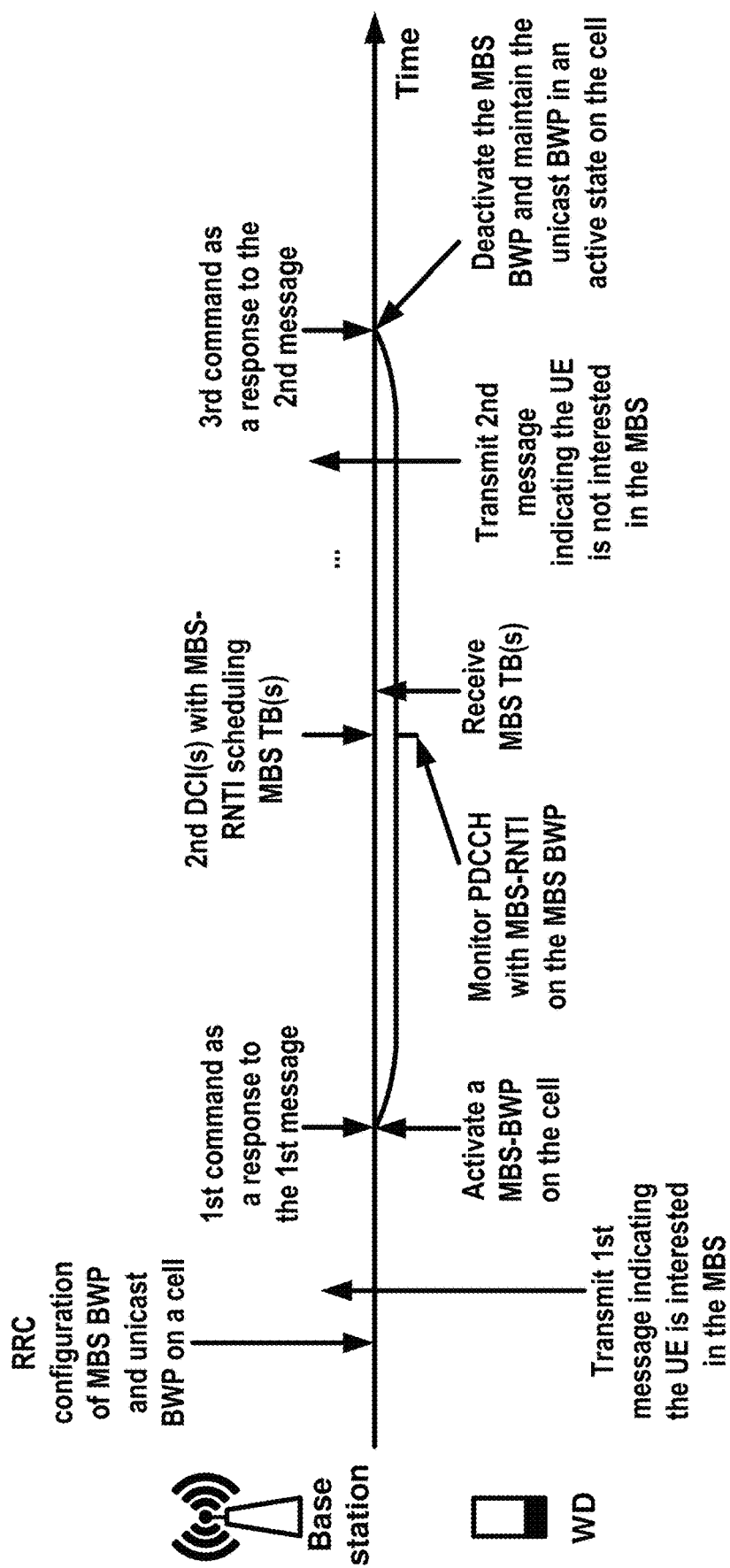
FIG. 29 illustrates an example of BWP management for MBS, according to some embodiments.

FIG. 29 shows an example of how an MBS BWP of a cell is activated and deactivated, according to an example embodiment. In an example, a wireless device may receive from a base station one or more RRC messages comprising configuration parameters of an MBS session.

In an example, the one or more RRC messages may comprise configuration parameters of a plurality of BWPs of a cell. The plurality of BWPs may comprise one or more MBS BWPs and one or more unicast BWPs. In an example, the configuration parameters of a BWP may comprise at least one of: PDCCH configuration parameters, PDSCH configuration parameters, SPS configuration parameters, radio link monitoring configuration parameters, etc. PDCCH configuration parameters may comprise at least one of: one or more CORESET configuration parameters, one or more SS configuration parameters, etc. PDSCH configuration parameters may comprise at least one of: a data scrambling identity for PDSCH, DMRS configuration parameters, TCI configuration parameters, time and/or frequency resource allocation configuration indications, rate match pattern indications, RS configuration parameters, or a combination thereof. The PDCCH configuration parameters may be implemented based on the example embodiments described above with respect to FIG. 25 and/or FIG. 26.

In an example, the one or more RRC messages may further comprise configuration parameters of one or more MBS sessions. Configuration parameters of an MBS session may comprise at least one of: an MBS session identifier, a Temporary Mobile Group Identity (TMGI), an MBS-RNTI (or G-RNTI, SC-RNTI, etc.) associated with the MBS session, or one or more DRX configuration parameters for a DRX operation of the MBS session. The MBS session identifier may contain octet 3-5 of the IE Temporary Mobile Group Identity (TMGI). The first octet contains the third octet of the TMGI, the second octet contains the fourth octet of the TMGI and so on.

In an example, configuration parameters of an MBS BWP may further comprise one or more MBS specific configuration parameters of an MBS session associated with the MBS BWP. In an example, the one or more MBS specific configuration parameters for the MBS BWP may comprise an MBS session identifier identifying an MBS session of a plurality of MBS sessions, an MBS-RNTI associated with the MBS session of the plurality of MBS sessions, or a TMGI value associated with the MBS session.

In an example, the one or more RRC messages may indicate a first BWP from a plurality of BWPs of a cell as an MBS BWP and indicate at least a second BWP from the plurality of BWPs as unicast BWP(s). The wireless device may activate one of the unicast BWP(s) for reception of unicast PDSCH and/or broadcast PDSCH (e.g., scheduled by SI-RNTI or P-RNTI). The wireless device may maintain the first BWP, configured as the MBS BWP, in a deactivated state after receiving the one or more RRC messages.

In an example, the wireless device may be interested in the MBS session. In this example, the wireless device may transmit to the base station one or more message (e.g., $1^{st}$ message in FIG. 29) indicating that the wireless device is interested in the MBS. The message may be transmitted in a first RRC message, a first MAC CE (e.g., based on examples of FIG. 20), or a first UCI via a PUCCH/PUSCH. The wireless device may receive an acknowledgement for the one or more transmitted message. The acknowledgement may comprise a second RRC message, a second MAC CE (e.g., based on examples of FIG. 19), or a second DCI via a PDCCH. In response to receiving the acknowledgement, the wireless device may activate the MBS BWP. Based on activating the MBS BWP, the wireless device may monitor PDCCH for receiving DCI(s) (e.g., $2^{nd}$ DCI(s) in FIG. 29) with CRC scrambled by MBS-RNTI, wherein the DCI(s) schedules MBS TB(s) scrambled by the MBS-RNTI and transmitted to a group of wireless devices configured with the MBS-RNTI. Based on the DCI(s), the wireless device may receive the MBS TB(s). In an example, the wireless device may monitor PDCCH on the activated unicast BWP for receiving a $3^{rd}$ DCI scheduling unicast TB via a PDSCH (not shown in FIG. 29). The wireless device may receive the unicast TB via the PDSCH based on receiving the $3^{rd}$ DCI.

In an example, monitoring PDCCH on an activated unicast BWP and monitoring PDCCH on an activated MBS BWP may overlap in time. In an example, the wireless device may monitor PDCCH on the unicast BWP in a first slot (or first symbols) different from a second slot (or second symbols) in which the wireless device monitors PDCCH on the MBS BWP. In an example, the wireless device may monitor PDCCH on the unicast BWP in a same slot (or same symbols) on which the wireless device monitors PDCCH on the MBS BWP.

In an example, the wireless device may not be interested in the MBS session, e.g., after the wireless device finishes reception of the MBS TB(s) of the MBS session. The wireless device may transmit to the base station one or more message (e.g., $2^{nd}$ message in FIG. 29) indicating that the wireless device is not interested in the MBS. The message may be transmitted in a RRC message, a MAC CE, or a UCI via a PUCCH/PUSCH. The wireless device may receive an acknowledgement for the one or more message. The acknowledgement (e.g., $3^{rd}$ command in FIG. 29) may comprise a RRC message, a MAC CE, or a DCI via a PDCCH. In response to receiving the acknowledgement, the wireless device may deactivate the MBS BWP. Based on deactivating the MBS BWP, the wireless device may skip or stop monitoring PDCCH on the MBS BWP. The wireless device may deactivate the MBS BWP and maintain one of the unicast BWPs in an active state. The wireless device may maintain (e.g., not release or not clear) the configuration parameters of the MBS after the wireless device deactivates the MBS BWP.

In an example embodiment, the process for activation/deactivation of the MBS BWP described with respect to FIG. 29 may be modified to reduce signaling overhead and improve MBS performance. In an example, the wireless device may activate the MBS BWP in response to transmitting the first message indicating that the wireless device is interested in the MBS. In this example, the wireless device may not need to wait for the response, from the base station, for the transmitted first message, thereby reducing latency in activating the MBS BWP. In an example, the wireless device may deactivate the MBS BWP in response to transmitting the second message indicating that the wireless device is not interested in the MBS. In this example, the wireless device may not need to wait for the response, from the base station, for the transmitted second message, thereby reducing latency in deactivating the MBS BWP.

In an example embodiment, the process for activation/deactivation of the MBS BWP described with respect to FIG. 29 may be modified to reduce signaling overhead and improve MBS performance. In an example, the wireless device may activate the MBS BWP in response to transmitting the first message indicating that the wireless device is interested in the MBS. The wireless device may not need to wait for the response, from the base station, for the transmitted first message, thereby reducing latency in activating the MBS BWP. In an example, the wireless device may deactivate the MBS BWP in response to receiving from a base station an acknowledgement for the transmitted second message indicating that the wireless device is not interested in the MBS.

In an example embodiment, the process for activation/deactivation of the MBS BWP described with respect to FIG. 29 may be modified to reduce signaling overhead and improve MBS performance. In an example, the wireless device may activate the MBS BWP in response to receiving an acknowledgement for a transmitted first message indicating that the wireless device is interested in the MBS. In an example, the wireless device may deactivate the MBS BWP in response to transmitting a second message indicating that the wireless device is not interested in the MBS. In this example, the wireless device may not need to wait for the response, from the base station, for the transmitted second message, thereby reducing latency in deactivating the MBS BWP.

In an example embodiment, the process for activation/deactivation of the MBS BWP described with respect to FIG. 29 may be modified to reduce signaling overhead and improve MBS performance. In an example, the wireless device may activate the MBS BWP in response to receiving one or more RRC messages indicating an MBS session is configured on the MBS BWP of the cell. The MBS BWP may be different from a BWP configured as a first active BWP by a RRC message (e.g., by firstActiveDownlinkBWP IE). In this example embodiment, the wireless device may not need to transmit the first message indicating the wireless device is interested in the MBS, thereby reducing latency in activating the MBS BWP.

In an example embodiment, the process for activation/deactivation of the MBS BWP described with respect to FIG. 29 may be modified to reduce signaling overhead and improve MBS performance. In an example, the wireless device may activate the MBS BWP for the MBS (e.g., based on RRC configuration of the MBS). The wireless device may transmit to the base station the first message indicating that the wireless device is interested in the MBS in response to (or after) activating the MBS BWP, thereby reducing latency in activating the MBS BWP. The first message may comprise at least one of a RRC message, a MAC CE, or UCI. In an example, the wireless device may deactivate the MBS BWP for the MBS. The wireless device may transmit to the base station the second message indicating that the wireless device is not interested in the MBS in response to (or after) deactivating the MBS BWP, thereby reducing latency in deactivating the MBS BWP. The second message may comprise at least one of a RRC message, a MAC CE, or UCI.

The above example embodiments describing modifications to the MBS-BWP activation/deactivation process shown in FIG. 29 may improve power consumption of a wireless device when the wireless device supports MBS reception. Example embodiments may enable a base station to determine a subscriber's state for reception of an MBS session and/or enable network operator to charge MBS session fee accordingly based on the subscriber's state.

Figure 30:
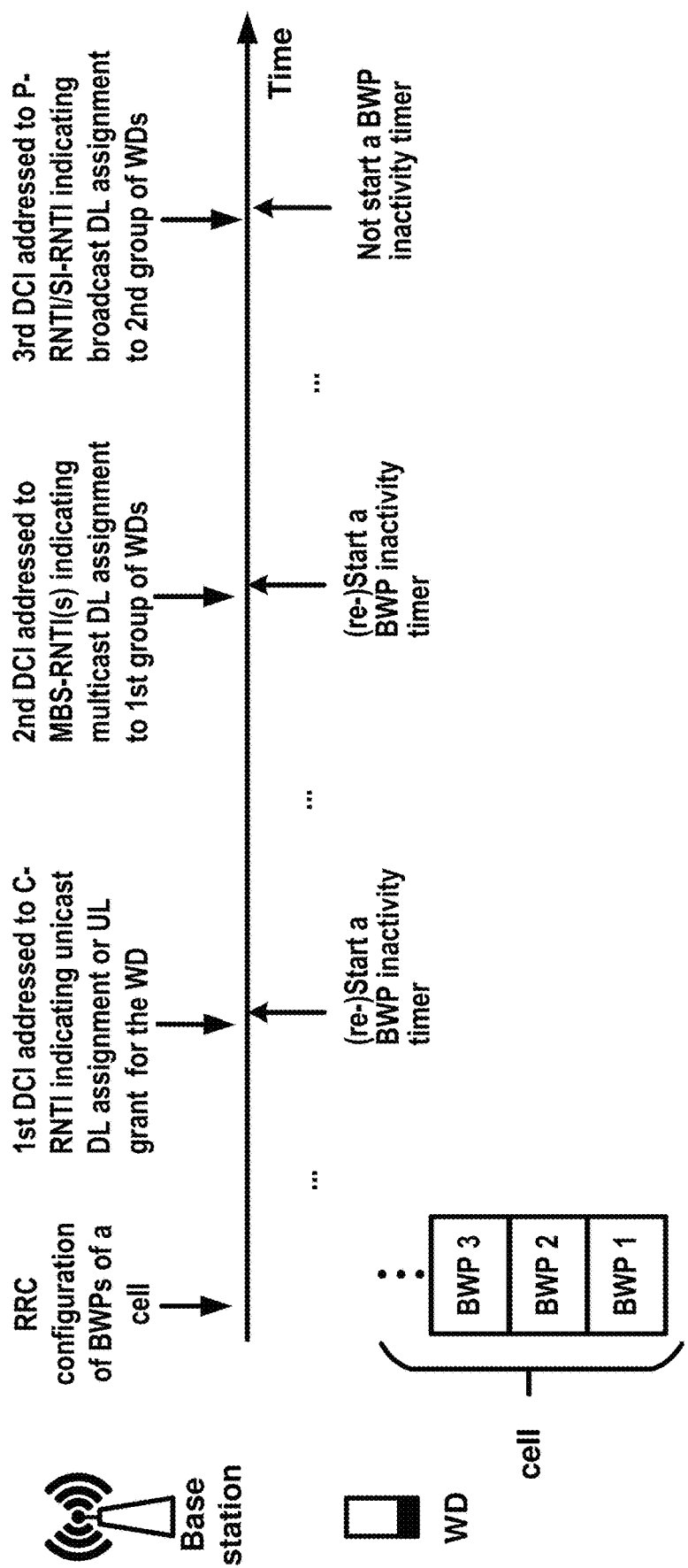
FIG. 30 illustrates an example of BWP management for MBS, according to some embodiments.

FIG. 30 shows an example of BWP state management for an MBS, according to an embodiment. In an example, a wireless device may receive from a base station one or more RRC messages comprising configuration parameters of an MBS session. The one or more RRC messages may be implemented based on the examples described above with respect to FIG. 28A, FIG. 28B and/or FIG. 29. The one or more RRC messages may comprise an MBS dedicated RNTI for receiving MBS TBs associated with the MBS session. The MBS dedicated RNTI may be different from other RNTIs (e.g., C-RNTI, CS-RNTI, MCS-RNTI, P-RNTI, SI-RNTI, etc.).

In an example, the one or more RRC messages may indicate a first DL BWP from a plurality of BWPs of a cell as an MBS BWP and at least a second DL BWP from the plurality of BWPs as unicast BWP(s), based on example embodiments of FIG. 28A.

In an example, the one or more RRC messages may indicate that MBS PDCCH/PDSCH and unicast PDCCH/PDSCH are shared in a same BWP of the plurality of BWPs in a cell, based on example embodiments of FIG. 28B.

In an example, the one or more RRC messages may comprise a timer value of a BWP inactivity timer for the cell. The wireless device may activate one or more of the DL BWP(s) for reception of unicast PDSCH, broadcast PDSCH (e.g., scheduled by SI-RNTI or P-RNTI) and/or multicast PDSCH (scheduled by the MBS dedicated RNTI). The wireless device may manage BWP states by implementing examples of FIG. 22. In addition to FIG. 22, the wireless device may further manage BWP states based on the example embodiments that will be further described below with respect to FIG. 30.

As shown in FIG. 30, the wireless device may receive a first DCI (e.g., $1^{st}$ DCI) addressed to C-RNTI (or CS-RNTI) indicating a unicast downlink assignment or an uplink grant for the wireless device, with the unicast downlink assignment being used for unicast TB addressed to the wireless device with the C-RNTI or CS-RNTI. In response to receiving the first DCI, the wireless device may (re-)start the BWP inactivity timer. In response to receiving a TB scheduled by the first DCI, the wireless device may (re-)start the BWP inactivity timer.

As shown in FIG. 30, the wireless device may receive a second DCI (e.g., $2^{nd}$ DCI) addressed to the MBS dedicated RNTI indicating multicast downlink assignment for a first group of wireless devices configured with the MBS dedicated RNTI, with the first group of wireless devices comprising the wireless device. In an example, a second wireless device not configured with the MBS dedicated RNTI (and therefore not included in the first group of wireless devices) may not receive the second DCI. The wireless device, based on receiving the second DCI, may start the BWP inactivity timer. In response to receiving an MBS TB scheduled by the second DCI and the MBS TB being scrambled by the MBS dedicated RNTI, the wireless device may (re-)start the BWP inactivity timer. (Re-)starting the BWP inactivity timer based on the second DCI may prolong the active state of the BWP so that the wireless device may keep receiving future MBS DCI/TB s.

As shown in FIG. 30, the wireless device may receive a third DCI (e.g., $3^{rd}$ DCI) addressed to predefined RNTIs (e.g., SI-RNTI or P-RNTI) indicating broadcast downlink assignment for a second group of wireless devices, the second group of wireless devices comprising the wireless device. The predefined RNTIs, e.g., as "FFFF" for SI-RNTI, or as "FFFE" for P-RNTI, may be known to any wireless device in the system. The wireless device, based on receiving the third DCI, may not start (or may keep running) the BWP inactivity timer. In response to receiving broadcast TB scheduled by the third DCI, the wireless device may not start the BWP inactivity timer. Example embodiment of FIG. 30 may improve multicast transmission throughput on a BWP. Otherwise, if not implementing the embodiment, by implementing existing technologies, the wireless device may switch to a default BWP in response to an expiry of the BWP inactivity timer due to the timer not being (re-)started (even after receiving the group common DCI scheduling a multicast transmission of a TB). Existing technologies may interrupt the MBS service due to the wireless device switching to the default BWP in the middle of receptions of TBs of an MBS session.

In an example embodiment, a wireless device, based on a comparison of a RNTI associated with a DCI (e.g., $1^{st}$ DCI, $2^{nd}$ DCI or $3^{rd}$ DCI in FIG. 30) and an MBS dedicated RNTI, may determine whether a TB scheduled by the DCI is a multicast transmission of a MBS session, or a broadcast transmission (e.g., for a system information, for paging message, for random access response message, etc.). The wireless device may determine whether to (re-) start a BWP inactivity timer based on whether the TB scheduled by the DCI is the multicast transmission of the MBS session or the broadcast transmission.

In an example, in response to the RNTI associated with the DCI being a predefined RNTI different from the MBS dedicated RNTI, the wireless device may determine the TB scheduled by the DCI is the broadcast transmission (e.g., for a system information, for paging message, for random access response message, etc.). In response to the RNTI associated with the DCI being the predefined RNTI, the wireless device may not start (or may keep running) the BWP inactivity timer. In response to receiving broadcast TB scheduled by the DCI, the wireless device may not start the BWP inactivity timer.

In an example, in response to the RNTI associated with the DCI being the MBS dedicated RNTI, the wireless device may determine the TB scheduled by the DCI is a multicast transmission of the MBS session. In response to the RNTI associated with the DCI being the MBS dedicated RNTI, the wireless device may (re-)start the BWP inactivity timer. In response to receiving the TB scheduled by the DCI, the wireless device may start the BWP inactivity timer.

In an example embodiment, the BWP state management for MBS shown and described with respect to FIG. 30 may be modified to enhance system throughput and reduce power consumption. In an example, a wireless device may receive from a base station one or more RRC messages comprising configuration parameters comprising an MBS timer (e.g., an MBS inactivity timer, or an MB S deactivation timer, or an MB S dedicated BWP inactivity timer, etc.) on a cell. The MBS timer may be independently or separately configured/managed from a BWP inactivity timer of the cell, a DRX timer (e.g., a DRX on duration timer, a DRX inactivity timer etc.), or a SCell deactivation timer of the cell.

In an example, the wireless device may start the MBS timer in response to activating the MBS session or in response to activating a BWP for the MBS session. In an example, the wireless device may start or restart the MBS timer in response to receiving a DCI with CRC scrambled by the MBS-RNTI via a PDCCH resource, and/or in response to receiving a TB scheduled by the DCI and scrambled by the MBS-RNTI via a PDSCH resource. In response to an expiry of the MBS timer for the MBS session, the wireless device may deactivate the BWP on which the MBS session is configured and/or maintain an active BWP for unicast transmission wherein the BWP inactivity timer is running on the cell. In response to an expiry of the MBS timer for the MBS session, the wireless device may deactivate the cell on which the MBS session is configured.

In an example, when configured with a BWP inactivity timer, the wireless device may apply the BWP inactivity timer on any active BWP of a cell, except for the default BWP (if in an active state) of the cell. Applying the BWP inactivity timer may be implemented based on the examples described with respect to FIG. 22. In an example, when configured with MBS BWP, a wireless device may not apply the BWP inactivity timer for an MBS BWP in the cell. When the wireless device is configured with a BWP inactivity timer on a cell, the wireless device may apply the BWP inactivity timer on one or more BWPs of the cell, except the MBS BWP and the default BWP. The wireless device may maintain an MBS BWP activated state until receiving a command indicating a deactivation of the MBS BWP. Not applying BWP inactivity timer on the MBS BWP may improve MBS reception continuation. In an embodiment, the wireless device may activate or deactivate the MBS BWP based on an explicit command and not based on a BWP inactivity timer.

The above example embodiments describing modifications to the BWP state management for MBS shown in FIG. 30 may improve power consumption of a wireless device and/or improve system throughput and/or MBS transmission latency.

The above example embodiments of modifications to the processes described with respect to FIG. 29 and FIG. 30 may be combined. For example, the wireless device may activate the MBS BWP in response to receiving an acknowledgement for transmitting a message indicating that the wireless device is interested in an MBS. The wireless device may deactivate the MBS BWP in response to an expiry of an MBS timer (or a BWP inactivity timer for the MBS BWP). In an example, the wireless device may activate the MBS BWP in response to receiving a RRC message configuring the MBS on the MBS BWP. The wireless device may deactivate the MBS BWP in response to an expiry of the MBS timer, etc. Various combinations of the example embodiments of modifications to the processes described above with respect to FIG. 29 and FIG. 30 may be implemented for power saving and/or efficient MBS session management.

Figure 31:
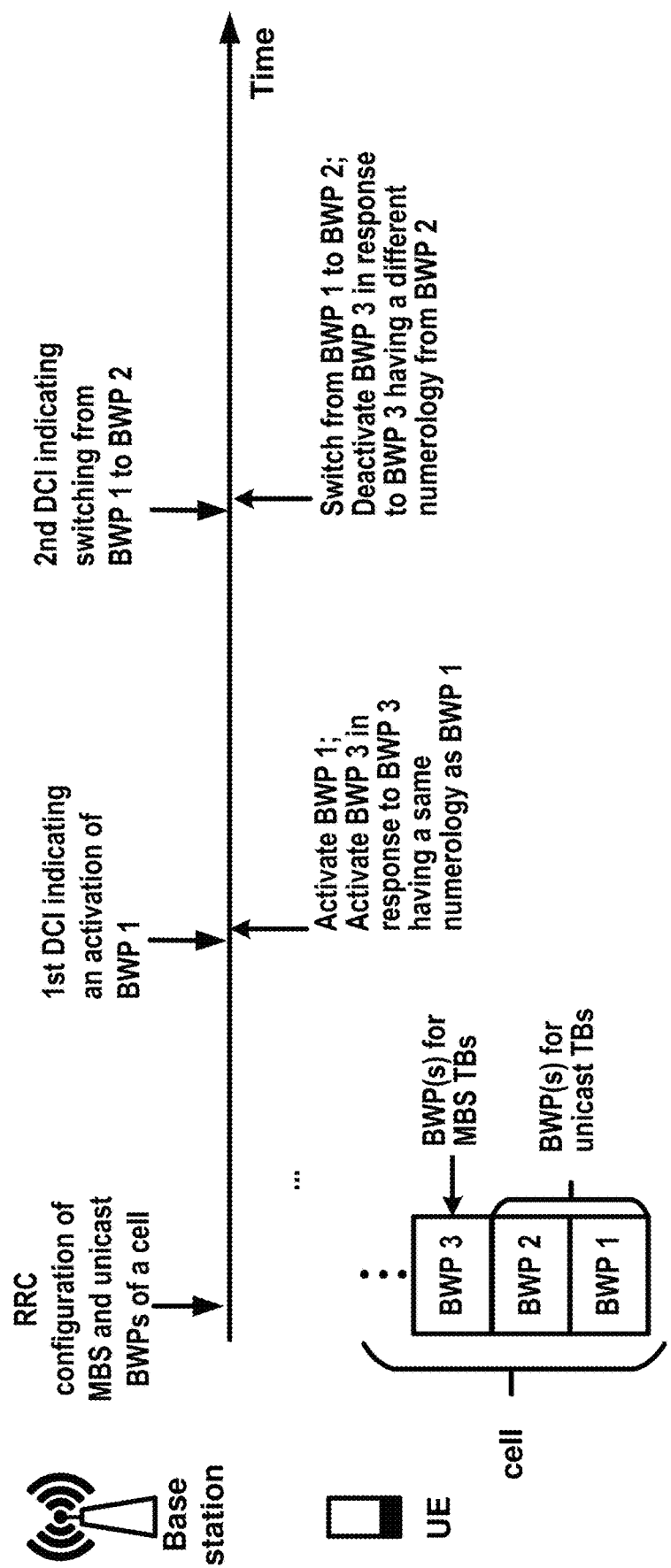
FIG. 31 illustrates an example of BWP management for MBS, according to some embodiments.

FIG. 31 shows an example of BWP state management for an MBS, according to an example embodiment. In an example, a wireless device may receive from a base station one or more RRC messages comprising configuration parameters of an MBS session. The one or more RRC messages may be implemented based on the examples described with respect to FIG. 28A, FIG. 28B, FIG. 29, and/or FIG. 30. The one or more RRC messages may comprise an MBS-RNTI for receiving MBS TB s associated with the MBS session. The MBS-RNTI may be different from other RNTIs (e.g., C-RNTI, CS-RNTI, MCS-RNTI, P-RNTI, SI-RNTI, etc.). In an example, the one or more RRC messages may indicate a first DL BWP, of a plurality of BWPs of a cell, as being an MBS BWP and indicate at least a second DL BWP, of the plurality of BWPs, as being unicast BWP(s). Each MBS of the plurality of BWPs may be associated with a numerology (e.g., subcarrier spacing, cyclic prefix length configuration, etc.). The wireless device may apply a baseband/RF processing algorithm corresponding to a numerology. The one or more RRC messages may comprise a timer value of a BWP inactivity timer for the cell. The wireless device may activate one or more of the DL BWP(s) for reception of unicast PDSCH, broadcast PDSCH (e.g., scheduled by SI-RNTI or P-RNTI), and/or multiple PDSCH (scheduled by MBS-RNTI). The wireless device may manage BWP states by implementing examples of FIG. 22. In addition to FIG. 22, the wireless device may further manage BWP states based on the examples further described below with respect to FIG. 31.

As shown in FIG. 31, the wireless device may activate a first BWP of the unicast BWP(s) for reception of unicast PDSCH or for monitoring PDCCH for reception of unicast DCIs (or broadcast DCIs). The wireless device may determine whether the MBS BWP configured for reception of MBS PDSCH associated with the MBS session has a same numerology as the first BWP. In response to determining that the numerology of the MBS-BWP is the same as the first BWP, the wireless device may activate the MBS BWP. In response to determining that the numerology of the MBS-BWP is different from the first BWP, the wireless device may not activate the MBS BWP.

As shown in FIG. 31, the wireless device may switch from the first BWP to a second BWP as an active BWP for reception of unicast PDSCH or for monitoring PDCCH for reception of unicast DCIs (or broadcast DCIs). The wireless device may determine, based on the switching from the first BWP to the second BWP, whether the MBS BWP configured for reception of MBS PDSCH associated with the MBS session has a same numerology as the second BWP. In response to determining that the numerology of the MBS-BWP is the same as the second BWP, the wireless device may keep the MBS BWP (if activated) in an active state. In response to determining that the numerology of the MBS- BWP is different from the second BWP, the wireless device may deactivate the MBS BWP if the MBS BWP is in the active state.

The example embodiments described above with respect to FIG. 31 may reduce signaling overhead for MBS transmission and reduce implementation cost of a wireless device.

Figure 32:
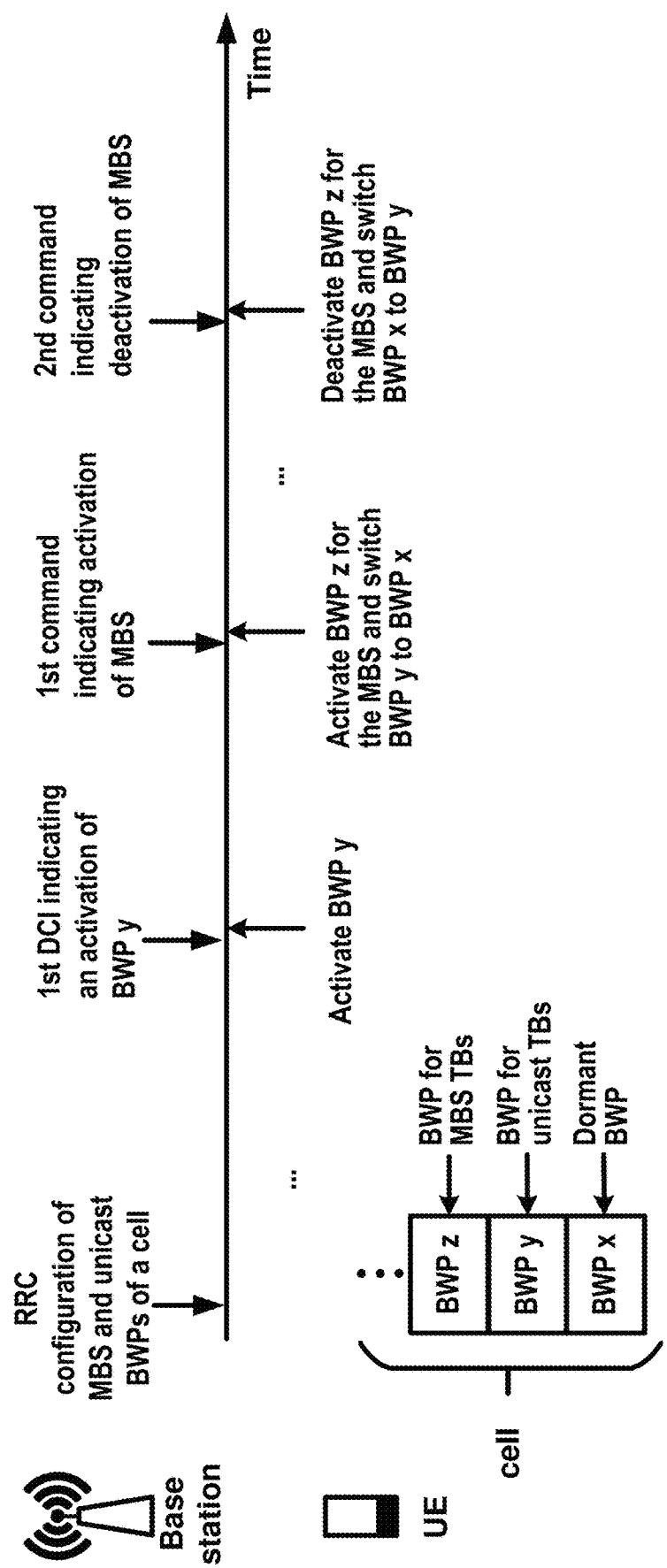
FIG. 32 illustrates an example of BWP management for MBS, according to some embodiments.

FIG. 32 shows an example of BWP state management for an MBS, according to an example embodiment. In an example, a wireless device may receive from a base station one or more RRC messages comprising configuration parameters of an MBS session. The one or more RRC messages may be implemented based on the examples described above with respect to FIG. 28A and/or FIG. 28B. The one or more RRC messages may comprise an MBS-RNTI for receiving MBS TB s associated with the MBS session. The MBS-RNTI may be different from other RNTIs (e.g., C-RNTI, CS-RNTI, MCS-RNTI, P-RNTI, SI-RNTI, etc.).

In an example, the one or more RRC messages may indicate a first DL BWP (e.g., BWP z) from a plurality of BWPs of a cell as an MBS BWP and indicate at least a second DL BWP (e.g., BWP y) from the plurality of BWPs as unicast BWP(s). The one or more RRC messages may indicate a third DL BWP from the plurality of BWPs of the cell as a dormant BWP (e.g., BWP x). Each MBS of the plurality of BWPs may be associated with a numerology (e.g., subcarrier spacing, cyclic prefix length configuration, etc.). The wireless device may apply a baseband/RF processing algorithm corresponding to a numerology. The one or more RRC messages may comprise a timer value of a BWP inactivity timer for the cell. The wireless device may activate one or more of the DL BWP(s) for reception of unicast PDSCH, broadcast PDSCH (e.g., scheduled by SI-RNTI or P-RNTI), and/or multiple PDSCH (scheduled by MBS-RNTI). The wireless device may manage BWP states by implementing the examples as described above with respect to FIG. 22 and/or FIG. 31. In addition to the examples described with respect to FIG. 22 and/or FIG. 31, the wireless device may further manage BWP states based on the example embodiments described with respect to FIG. 32.

As shown in FIG. 32, the wireless device may activate a BWP (e.g., BWP y) of the unicast BWP(s) for reception of unicast PDSCH or for monitoring PDCCH for reception of unicast DCIs (or broadcast DCIs).

As shown in FIG. 32, the wireless device may receive a first command (e.g., $1^{st}$ command) indicating an activation/configuration of the MBS session. In response to receiving the first command, the wireless device may activate an MBS BWP (e.g., BWP z) and switch an active unicast BWP (BWP y) to the dormant BWP (BWP x). In an example, in response to switching to the dormant BWP in the cell, the wireless device may: stop monitoring PDCCH on the dormant BWP, stop receiving PDSCH on the dormant BWP, and/or transmit a CSI report for the dormant BWP while the wireless device maintains the cell in an active state.

In an example, the wireless device may receive a first command (e.g., $1^{st}$ command) indicating an activation/configuration of the MBS session. In response to receiving the first command, the wireless device may determine whether the MBS BWP has a same numerology as BWP y. In response to determining that the MBS BWP has the same numerology as BWP y, the wireless device may activate the MBS BWP while maintaining BWP y in an active state. In response to the MBS BWP having a different numerology from BWP y, the wireless device may activate MBS BWP and switch BWP y to BWP x. In response to switching to BWP x, the wireless device may stop monitoring PDCCH on BWP z and transmit CSI report for BWP x.

As shown in FIG. 32, the wireless device may receive a second command (e.g., $2^{nd}$ command) indicating a deactivation (also referred to as clearing or release) of the MBS session. The wireless device may deactivate an MBS BWP (e.g., BWP z) and switch from BWP x to BWP y. In response to switching to BWP y, the wireless device may start monitoring PDCCH on BWP y and transmit CSI report for BWP y.

In an example, a wireless device may periodically switch an active BWP between a unicast BWP (e.g., BWP y) and an MBS BWP (e.g., BWP z) on a cell. The wireless device may switch the active BWP periodically based on configuration parameters in the received RRC message. The configuration parameters may comprise one or more time domain parameters (e.g., a periodicity for a switching cycle, a first time duration of the cycle for keeping the unicast BWP in active state, a second time duration of the cycle for keeping the MBS BWP in active state, etc.).

In an example, a wireless device may determine whether to stop monitoring PDCCH on an MBS BWP when switching a unicast BWP in a cell. The wireless device may transmit to a base station UE capability information indicating whether the wireless device is capable of monitoring PDCCH (or receiving PDSCH) on the MBS BWP and simultaneously performing a unicast active BWP switching in a cell. Based on a wireless device being capable of monitoring PDCCH (or receiving PDSCH) on the MBS BWP and simultaneously performing a unicast active BWP switching in a cell, the wireless device may keep monitoring PDCCH (or receiving PDSCH) on the MBS BWP in the cell during the unicast active BWP switching. Based on a wireless device not being capable of monitoring PDCCH (or receiving PDSCH) on the MBS BWP and simultaneously performing a unicast active BWP switching in a cell, the wireless device may stop monitoring PDCCH (or receiving PDSCH) on the MBS BWP in the cell during the unicast active BWP switching.

In an example, a wireless device may keep both an MBS BWP and a unicast BWP in an active state in a cell. The wireless device may switch from a first BWP to a second BWP as an active unicast BWP. When switching the active unicast BWP, the wireless device may stop monitoring PDCCH on the MBS BWP during a time duration when the wireless device is performing the active unicast BWP switching. In an example, when switching the active unicast BWP and based on the wireless device not being capable of monitoring PDCCH (or receiving PDSCH) on the MBS BWP and simultaneously performing the unicast active BWP switching, the wireless device may stop monitoring PDCCH on the MBS BWP during a time duration of the active unicast BWP switching.

In an example, a wireless device may keep both an MBS BWP and a unicast BWP in an active state in a cell. The wireless device may switch from a first BWP to a second BWP as an active unicast BWP. When switching the active unicast BWP, the wireless device may keep monitoring PDCCH (or receiving PDSCH) on the MBS BWP during a time duration of the active unicast BWP switching. In an example, when switching the active unicast BWP and based on the wireless device being capable of monitoring PDCCH (or receiving PDSCH) on the MBS BWP and simultaneously performing the unicast active BWP switching, the wireless device may keep monitoring PDCCH (or receiving PDSCH) on the MBS BWP during a time duration of the active unicast BWP switching.

In an example, a wireless device may activate one of an MBS BWP and a unicast BWP in a cell. The wireless device may activate the MBS BWP in the cell. The wireless device may deactivate the MBS BWP when the wireless device finishes reception of an MBS session. The wireless device may deactivate the MBS BWP based on one or more of the examples described with respect to FIG. 29, FIG. 30, FIG. 31 and/or FIG. 32. In response to deactivating the MBS BWP, the wireless device may activate a unicast BWP in the cell (e.g., autonomously, or automatically). In an example, the wireless device may determine an initial BWP or a default BWP, from the plurality of BWPs of the cell, as the unicast BWP for the activation. In an example, the wireless device may determine a last active unicast BWP (e.g., a latest unicast BWP in active state before activating the MBS BWP), from the plurality of BWPs of the cell, as the unicast BWP for the activation. The wireless device may determine a BWP, configured for switching out of MBS transmission, as the unicast BWP for the activation. The base station may transmit to the wireless device RRC messages indicating the BWP, from the plurality of BWPs of the cell, for switching out of MBS transmission.

In an example, the wireless device may transmit to a base station a message indicating that the wireless device is no longer interested in the MBS session. The wireless device may keep the MBS BWP in an active state until the wireless device receives an acknowledgement from the base station for the transmitted message. In an example, the acknowledgement may comprise a DCI indicating an active BWP switching from the MBS BWP to a unicast BWP. Based on the acknowledgement, the wireless device may switch from the MBS BWP to the unicast BWP as the active BWP in the cell. The unicast BWP may comprise at least one of: an initial BWP, a default BWP, a last active unicast BWP, or a dedicated BWP configured for switching out of an MBS BWP associated with the MBS session.

In an example, a wireless device may receive, from a base station, a message comprising configuration parameters of a cell comprising a plurality of BWPs comprising a first DL BWP for unicast transmission and a second DL BWP for MBS. The message may further comprise an MB S-RNTI for the MBS. The wireless device may activate the first DL BWP. The wireless device may activate the second downlink BWP, when the first DL BWP is in an activated state and in response to the second DL BWP having a same numerology as the first DL BWP and the second DL BWP being configured with the MBS. The wireless device may receive, from the base station, a DCI based on the MB S-RNTI when the second downlink BWP being activated.

In an example, the wireless device may receive a TB, via a PDSCH resource of the second DL BWP, scrambled by the MBS-RNTI based on receiving the DCI.

In an example, the wireless device may monitor, based on the activation of the second DL BWP, a PDCCH on the second DL BWP for receiving the DCI, wherein the DCI indicates a downlink assignment for a TB transmitted to a group of wireless devices configured with the MBS-RNTI.

In an example, the wireless device may transmit to the base station a message indicating that the wireless device is receiving the MBS configured on the second DL BWP, in response to activating the second DL BWP.

In an example, the wireless device may switch the first DL BWP to a third DL BWP of the cell. The wireless device may deactivate the second DL BWP when the third DL BWP is in an activated state and in response to the numerology of the second DL BWP being different from a numerology of the third DL BWP.

In an example, the wireless device may transmit to the base station a message indicating that the wireless device stops receiving the MBS configured on the second DL BWP, in response to deactivating the second DL BWP.

In an example, the wireless device may switch the first DL BWP to a dormant DL BWP of the cell. In response to the switching to the dormant DL BWP, the wireless device may keep the second DL BWP in an active state. In response to the switching to the dormant DL BWP, the wireless device may keep the second DL BWP in an active state, independent of whether the numerology of the second DL BWP is different from a numerology of the dormant DL BWP.

In an example, the cell may be a primary cell of a plurality of cells. The cell may be a SCell of the plurality of cells.

In an example, the wireless device may monitor, on the first DL BWP, a second PDCCH for receiving a second DCI with a C-RNTI based on the first DL BWP being activated. The wireless device may monitor the second PDCCH on the first DL BWP during a time period when the wireless device monitors a first PDCCH on the second DL BWP. The wireless device may receive, on the first DL BWP, a second TB scrambled by the C-RNTI based on receiving a second DCI during the monitoring the second PDCCH on the first DL BWP.

In an example, a wireless device may receive a first message comprising configuration parameters of a cell comprising a plurality of bandwidth parts (BWPs) comprising a downlink BWP for multicast transmission of a multicast and broadcast service (MBS). The first message may further comprise MBS configuration parameters indicating an MBS radio network temporary identifier (MBS-RNTI) for the MBS.

In an example, the wireless device may transmit a second message indicating the wireless device is interested in the MBS. The wireless device may activate the downlink BWP in response to receiving an acknowledgement for the transmitted second message. The wireless device may monitor, based on activating the downlink BWP, downlink control channel for a downlink control information (DCI) with the MBS-RNTI. The wireless device may receive, via the downlink BWP, a transport bock scrambled by the MB S-RNTI value based on the DCI.

In an example, the wireless device may transmit a third message indicating the wireless device is not interested in the MBS. The wireless device may deactivate the downlink BWP in response to receiving an acknowledgement for the transmitted third message.

In an example, a wireless device may receive a message indicating a bandwidth part (BWP) of a plurality of BWPs of a cell. The message may further indicate an MBS radio network temporary identifier (MBS-RNTI) associated with an MBS session.

In an example, the wireless device may activate the BWP. The wireless device may start (or restart) a BWP inactivity timer of the cell in response to receiving on the BWP a downlink control information (DCI), addressed to the MBS-RNTI, indicating downlink assignment for a TB of the MBS session, wherein the TB is transmitted to a group of wireless devices configured with the MBS-RNTI and comprising the wireless device.

In an example, the wireless device may start (or restart) the BWP inactivity timer of the cell in response to receiving a second DCI, addressed to a cell network temporary identifier (C-RNTI) associated with the wireless device, indicating a second downlink assignment for a second TB, wherein the second TB is transmitted to the wireless device.

In an example, the wireless device may keep running (or may not stop) the BWP inactivity timer of the cell in response to receiving a third DCI, addressed to a predefined RNTI (e.g., P-RNTI or SI-RNTI), indicating a third downlink assignment for a third TB, wherein the third TB is transmitted to a second group of wireless devices comprising the wireless device.

In an example, the wireless device may deactivate the BWP in response to an expiry of the BWP inactivity timer.

In an example, the wireless device may transmit a second message indicating the wireless device is not interested in the MBS session. The wireless device may deactivate the BWP in response to receiving an acknowledgement for the transmitted second message.

In an example, a wireless device may receive a message indicating a bandwidth part (BWP) of a plurality of BWPs of a cell. The message may further indicate an MBS radio network temporary identifier (MBS-RNTI) associated with an MBS session. The message may further indicate an MBS inactivity timer value associated with the MBS session. In an example, the message may further indicate a BWP inactivity timer for the cell.

In an example, the wireless device may activate the BWP. The wireless device may transmit to a base station a first message indicating that the wireless device is interested in the MBS session. The wireless device may activate the BWP in response to transmitting the first message.

In an example, the wireless device may activate the BWP. The wireless device may transmit to a base station a first message indicating that the wireless device is interested in the MBS session. The wireless device may activate the BWP in response to receiving an acknowledgement for the first message. The first message may comprise a RRC message, a MAC CE, or UCI via PUCCH/PUSCH. The acknowledgement may comprise a RRC message, a MAC CE, or a DCI via a PDCCH.

In an example, the wireless device may start a MBS inactivity timer of the cell in response to receiving on the BWP a DCI, addressed to the MBS-RNTI, indicating downlink assignment for a TB of the MBS session, wherein the TB is transmitted to a group of wireless devices configured with the MBS-RNTI and comprising the wireless device. The wireless device may deactivate the BWP in response to an expiry of the MBS inactivity timer. In an example, the BWP inactivity timer of the cell is running when the MBS inactivity timer is expired.

In an example, the wireless device may start the MBS inactivity timer in response to activating the BWP. The wireless device may start the BWP inactivity timer in response to receiving the DCI.

In an example, the wireless device may transmit a second message indicating the wireless device is not interested in the MBS session. The second message may comprise a RRC message, a MAC CE, or UCI via a PUCCH/PUSCH. The wireless device may deactivate the BWP in response to transmitting the second message indicating the wireless device is not interested in the MBS session.

In an example, the wireless device may transmit a second message indicating the wireless device is not interested in the MBS session. The wireless device may deactivate the BWP in response to receiving an acknowledgement for the transmitted second message indicating the wireless device is not interested in the MBS session. The acknowledgement may comprise at least one of: a DCI, a MAC CE, or a RRC message.

What is claimed is:

1. A method comprising:
receiving, by a wireless device, radio resource control messages indicating:
a bandwidth part (BWP), of a cell, comprising first resource blocks (RBs) and second RBs;
common frequency resources, comprising the first RBs of the BWP, associated with a multicast and broadcast service (MBS) configured for wireless devices comprising the wireless device; and
a radio network temporary identifier (RNTI) associated with the MBS, wherein the radio resource control messages comprise configuration parameters of physical downlink control channels (PDCCHs) resources for receiving a downlink control information (DCI) for unicast transmission, in the BWP;
receiving, via the common frequency resources of the BWP, a group common DCI addressed to the RNTI, wherein the group common DCI indicates a multicast transmission of a transport block to the wireless device;
starting a BWP inactivity timer of the cell in response to receiving the group common DCI;
receiving the DCI for unicast transmission via the BWP, addressed to a cell radio network temporary identifier (C-RNTI) associated with the wireless device, indicating a unicast transmission of a second transport block to the wireless device; and
restarting the BWP inactivity timer of the cell in response to receiving the DCI for unicast transmission, in the BWP.

2. The method of claim 1, further comprising receiving, via the common frequency resources in the BWP, the transport block scrambled by the RNTI based on receiving the group common DCI.

3. The method of claim 1, further comprising deactivating the BWP of the cell in response to an expiry of the BWP inactivity timer.

4. The method of claim 1, wherein the radio resource control messages further comprise configuration parameters of PDCCHs resources for receiving the group common DCI for the MBS, in the first RBs of the BWP.

5. The method of claim 1, wherein the C-RNTI is different from the RNTI associated with the MBS.

6. The method of claim 1, further comprising receiving, via the BWP, a DCI indicating a broadcast transmission of a third transport block.

7. The method of claim 6, further comprising running, without restarting, the BWP inactivity timer of the cell in response to receiving the DCI indicating the broadcast transmission.

8. A wireless device comprising:
one or more processors; and
memory storing instructions that, when executed by the one or more processors, cause the wireless device to:
receive radio resource control messages indicating:
a bandwidth part (BWP), of a cell, comprising first resource blocks (RBs) and second RBs;
common frequency resources, comprising the first RBs of the BWP, associated with a multicast and broadcast service (MBS); and
a radio network temporary identifier (RNTI) associated with the MBS;
receive, via the common frequency resources of the BWP, a group common downlink control information (DCI) addressed to the RNTI, wherein the group common DCI indicates a multicast transmission of a transport block;

start a BWP inactivity timer of the cell in response to receiving the group common DCI;

receive a DCI via the BWP indicating a unicast transmission of a second transport block, wherein the radio resource control messages comprise configuration parameters of physical downlink control channels (PDCCHs) resources for receiving the second DCI for unicast transmission, in the BWP; and restart the BWP inactivity timer of the cell in response to receiving the DCI in the BWP.

9. The wireless device of claim 8, wherein the instructions further cause the wireless device to receive, via the common frequency resources in the BWP, the transport block scrambled by the RNTI based on receiving the group common DCI.

10. The wireless device of claim 8, wherein the instructions further cause the wireless device to deactivate the BWP of the cell in response to an expiry of the BWP inactivity timer.

11. The wireless device of claim 8, wherein the radio resource control messages comprise configuration parameters of PDCCHs resources for receiving the group common DCI for the MBS, in the first RBs of the BWP.

12. The wireless device of claim 8, wherein the DCI in the BWP is addressed to a cell radio network temporary identifier (C-RNTI) associated with the wireless device and the C-RNTI is different from the RNTI associated with the MBS.

13. The wireless device of claim 8, wherein the instructions further cause the wireless device to receive, via the BWP, a DCI indicating a broadcast transmission of a transport block.

14. The wireless device of claim 13, wherein the instructions further cause the wireless device to run, without restarting, the BWP inactivity timer of the cell in response to receiving the DCI indicating the broadcast transmission.

15. A method comprising:
receiving, by a wireless device, radio resource control messages indicating:
a bandwidth part (BWP), of a cell, comprising first resource blocks (RBs) and second RBs;
common frequency resources, comprising the first RBs of the BWP, associated with a multicast and broadcast service (MBS); and
a radio network temporary identifier (RNTI) associated with the MBS;

receiving, via the common frequency resources of the BWP, a group common downlink control information (DCI) addressed to the RNTI, wherein the group common DCI indicates a multicast transmission of a transport block;

starting a BWP inactivity timer of the cell in response to receiving the group common DCI;

receiving, via the BWP, a DCI indicating a broadcast transmission of a second transport block; and running, without restarting, the BWP inactivity timer of the cell when receiving the DCI indicating the broadcast transmission.

16. The method of claim 15, further comprising:
receiving a DCI via the BWP indicating a unicast transmission of a third transport block to the wireless device; and restarting the BWP inactivity timer of the cell in response to receiving the DCI in the BWP.

17. The method of claim 16, wherein the third DCI is addressed to a cell network temporary identifier (C-RNTI) associated with the wireless device.

18. The method of claim 17, wherein the C-RNTI is different from the RNTI associated with the MBS.

19. The method of claim 16, wherein the radio resource control messages comprise configuration parameters of PDCCHs resources 0 for receiving the DCI for unicast transmission, in the BWP.

20. The wireless device of claim 8, wherein the instructions further cause the wireless device to
receive, via the BWP, a DCI indicating a broadcast transmission; and nm, without restarting, the BWP inactivity timer of the cell in response to receiving the third DCI indicating the broadcast transmission.

* * * * *